(12) United States Patent
Troy et al.

(10) Patent No.: US 10,924,538 B2
(45) Date of Patent: Feb. 16, 2021

(54) SYSTEMS AND METHODS OF MONITORING SOFTWARE APPLICATION PROCESSES

(71) Applicant: THE BOEING COMPANY, Chicago, IL (US)

(72) Inventors: James J. Troy, Issaquah, WA (US); Bruce Marvin Craig, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 88 days.

(21) Appl. No.: 16/227,991

(22) Filed: Dec. 20, 2018

(65) Prior Publication Data

US 2020/0204620 A1 Jun. 25, 2020

(51) Int. Cl.
*H04L 29/08* (2006.01)
*G06F 11/30* (2006.01)
(Continued)

(52) U.S. Cl.
CPC ...... *H04L 67/1034* (2013.01); *G06F 11/3006* (2013.01); *G06F 11/3433* (2013.01);
(Continued)

(58) Field of Classification Search
CPC ......... H04L 43/10; H04L 43/50; H04L 69/40; H04L 45/28; H04L 67/1034;
(Continued)

(56) References Cited

U.S. PATENT DOCUMENTS 6,718,486 B1 4/2004 Roselli et al.
2004/0177099 A1 9/2004 Ganesh et al.
(Continued)

OTHER PUBLICATIONS

Villanueva, John C., "Active-Active vs. Active-Passive High Availability Cluster," BLOG Managed File Transfer and Network Solutions, <https://www.jscape.com/blog/active-active-vs-active-passive-high-availability-cluster> retrieved Dec. 20, 2018, 4 pgs.
(Continued)

*Primary Examiner* — Jungwon Chang
(74) *Attorney, Agent, or Firm* — Moore IP Law

(57) ABSTRACT

A system for monitoring processes includes a first compute node and a second compute node. The first compute node includes a process monitor, a status data analyzer, a process monitor checker, and a peer monitor. The process monitor is configured to generate process status data for a first instance of a software application. The status data analyzer is configured to selectively restart the first instance of the software application based on determining that an expected process of the first instance of the software application has stopped running. The process monitor checker is configured to restart the process monitor in response to determining that the process monitor has stopped running. The peer monitor is configured to, in response to determining that a second instance of the software application failed at the second compute node, perform an action based on incomplete tasks associated with the second instance of the software application.

22 Claims, 8 Drawing Sheets

(51) Int. Cl.
*G06F 11/34* (2006.01)
*H04L 12/24* (2006.01)
*H04L 12/26* (2006.01)
*H04L 29/14* (2006.01)

(52) U.S. Cl.
CPC ...... *H04L 41/0672* (2013.01); *H04L 43/0817* (2013.01); *H04L 67/1093* (2013.01); *H04L 69/40* (2013.01)

(58) Field of Classification Search
CPC ............. H04L 67/1093; H04L 43/0817; H04L 41/0672; H40L 51/30; H40L 51/34; G06F 11/1482; G06F 11/203; G06F 11/1471; G06F 11/1662; G06F 11/3006; G06F 11/3433
See application file for complete search history.

(56) References Cited

U.S. PATENT DOCUMENTS

| | | | |
|---|---|---|---|
| 2007/0244937 A1* | 10/2007 | Flynn, Jr. ............ | G06F 11/1662 |
| 2008/0244307 A1* | 10/2008 | Dasari ................ | G06F 11/1482 |
| | | | 714/4.12 |
| 2014/0359353 A1 | 12/2014 | Chen et al. | |
| 2017/0364423 A1* | 12/2017 | Peng .................... | G06F 11/203 |
| 2019/0149418 A1* | 5/2019 | Bertsche ............. | G06Q 20/223 |
| | | | 707/625 |
| 2019/0163584 A1* | 5/2019 | K ........................ | G06F 11/1471 |
| 2020/0004569 A1* | 1/2020 | Gupta ................ | G06F 9/45558 |

OTHER PUBLICATIONS

Wikipedia, "High-availability cluster," <https://en.wikipedia.org/wiki/High-availability_cluster> retrieved Dec. 20, 2018, 5 pgs.
Extended European Search Report for Application No. 19210850.4 dated May 18, 2020, 9 pgs.

* cited by examiner

SYSTEMS AND METHODS OF MONITORING SOFTWARE APPLICATION PROCESSES

FIELD OF THE DISCLOSURE

The present disclosure is generally related to monitoring processes of a software application.

BACKGROUND

A compute server can run a software application to provide a service. The software application can stop for various reasons, such as a stack overflow, network or power outages, or other unexpected disruptions. There may be a delay between the software application stopping and a system administrator determining that the software application has stopped. There may also be a delay between the system administrator detecting that the software application has stopped and the system administrator restarting the software application. The delays in restarting the software application increase a downtime during which the service is unavailable. Continuous monitoring of the software application by the system administrator can be inconvenient and costly.

SUMMARY

In a particular implementation, a system for monitoring processes includes a first compute node of multiple compute nodes that are configured to run multiple instances of a software application. The system also includes a second compute node of the multiple compute nodes. The first compute node includes a process monitor, a status data analyzer, a process monitor checker, and a peer monitor. The process monitor is configured to generate process status data for a first instance of the software application running at the first compute node. The status data analyzer is configured to determine, based on the process status data, whether an expected process of the first instance of the software application has stopped running at the first compute node. The status data analyzer is also configured to selectively restart the first instance of the software application based on determining that the expected process has stopped running at the first compute node. The process monitor checker is configured to determine whether the process monitor is running at the first compute node. The process monitor checker is also configured to restart the process monitor in response to determining that the process monitor has stopped running at the first compute node. The peer monitor is configured to determine whether a second instance of the software application failed at a second compute node of the multiple compute nodes. The peer monitor is also configured to, in response to determining that the second instance failed at the second compute node, perform an action based on incomplete tasks associated with the second instance of the software application.

In another particular implementation, a method of monitoring processes includes generating, at a first compute node of multiple compute nodes that are configured to run multiple instances of a software application, process status data for a first instance of the software application running at the first compute node. The method also includes determining, based on the process status data, whether an expected process of the first instance of the software application has stopped running at the first compute node. The method further includes selectively restarting the first instance of the software application at the first compute node based on determining that the expected process has stopped running at the first compute node. The method also includes determining whether a second instance of the software application failed at a second compute node of the multiple compute nodes. The method further includes, in response to determining that the second instance failed at the second compute node, performing an action based on incomplete tasks associated with the second instance of the software application.

In another particular implementation, a computer-readable storage device stores instructions that, when executed by a processor, cause the processor to perform operations including generating, at a first compute node of multiple compute nodes that are configured to run multiple instances of a software application, process status data for a first instance of the software application running at the first compute node. The operations also include determining, based on the process status data, whether an expected process of the first instance of the software application has stopped running at the first compute node. The operations further include selectively restarting the first instance of the software application at the first compute node based on determining that the expected process has stopped running at the first compute node. The operations also include determining whether a second instance of the software application failed at a second compute node of the multiple compute nodes. The operations further include, in response to determining that the second instance failed at the second compute node, performing an action based on incomplete tasks associated with the second instance of the software application.

The features, functions, and advantages described herein can be achieved independently in various implementations or may be combined in yet other implementations, further details of which can be found with reference to the following description and drawings.

DETAILED DESCRIPTION

Figure 1:
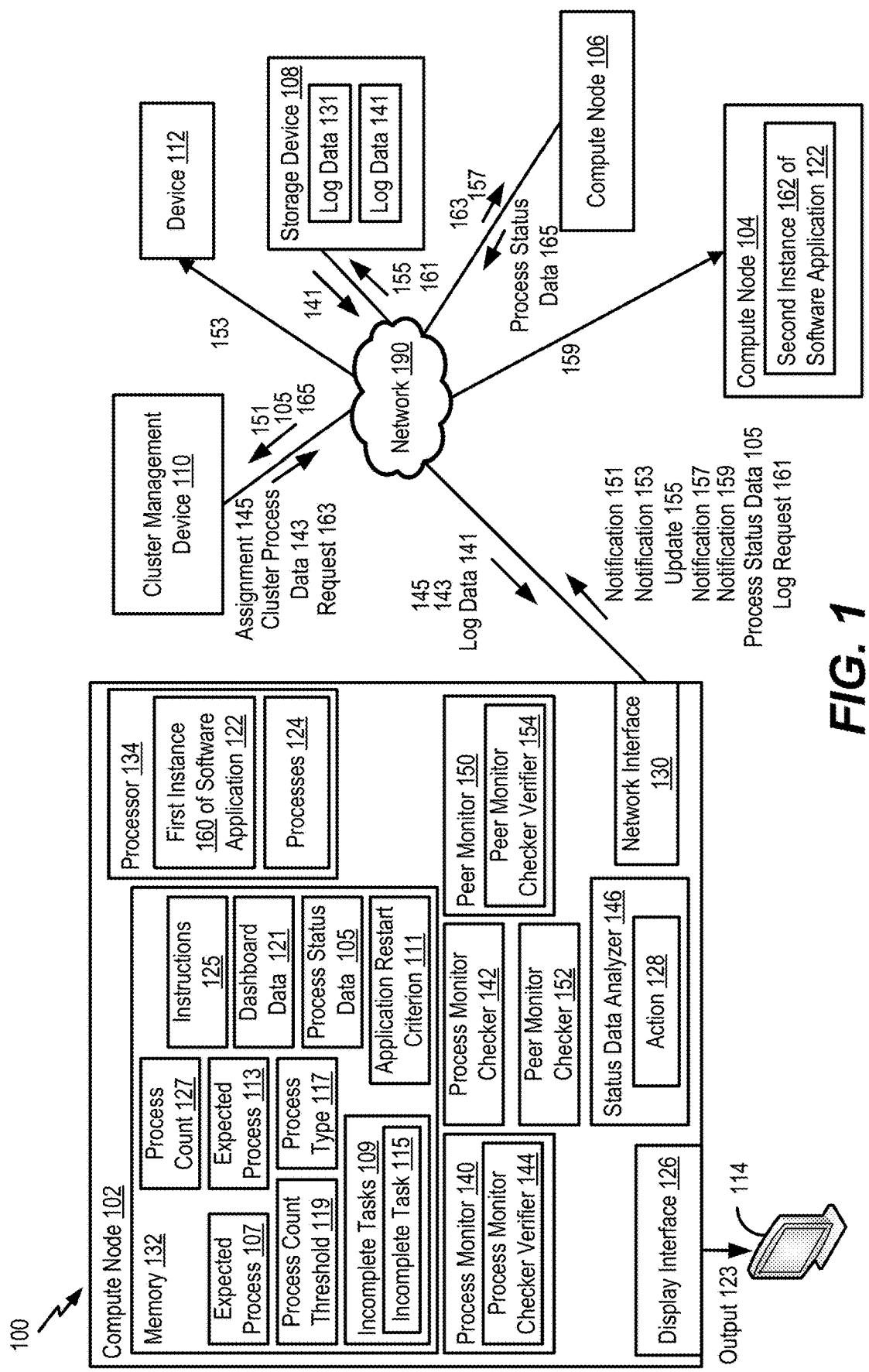
FIG. 1 is a block diagram that illustrates a system operable to perform monitoring of processes of a software application.

Implementations described herein are directed to monitoring processes of software applications. For example, a system includes multiple compute nodes that are configured to run multiple instances of a software application. For example, a first compute node is configured to run a first instance of the software application and a second compute node is configured to run a second instance of the software application. Each of the multiple compute nodes includes a service group that is configured to monitor whether the software application is running as expected at the node. For example, a service group of the first compute node includes a process monitor, a process monitor checker, or both. The process monitor generates process status data indicating processes of the software application that are running at the first compute node. The process monitor provides the process status data to a status data analyzer of the first compute node. The process monitor checker restarts the process monitor in response to determining that the process monitor has stopped running at the first compute node.

One or more components of the service group are configured to monitor one or more other components of the service group. In a particular example, the process monitor and the process monitor checker are configured to monitor each other. To illustrate, the process monitor restarts the process monitor checker in response to determining that the process monitor checker is not running (e.g., has stopped running) at the first compute node and the process monitor checker restarts the process monitor in response to determining that the process monitor is not running (e.g., has stopped running) at the first compute node. In this example, either one of the process monitor or the process monitor checker that is not running (e.g., that has stopped running) can be restarted by the other of the process monitor or the process monitor checker. The service group thus provides multiple levels of checks to provide robust monitoring of the processes at the first compute node.

The status data analyzer is configured to, based on analyzing the process status data, perform one or more actions such as generating notifications, restarting the software application, restarting a process of the software application, refraining from restarting the software application, shutting down the service group, updating log data, cleaning up temporary files, or a combination thereof. The status data analyzer has access to a list of processes that are to be monitored. To illustrate, the monitored processes are expected to be running when the software application is working properly. The status data analyzer performs the one or more actions in response to determining that the process status data indicates that an expected process has stopped running. In some examples, the status data analyzer performs different actions for different types of expected processes. In a particular example, the status data analyzer restarts the first instance of the software application in response to determining that a first expected process of a first process type is not running (e.g., has stopped running). As another example, the status data analyzer starts (or restarts) a second expected process in response to determining that the second expected process of a second process type is not running (e.g., has stopped running). The status data analyzer thus reduces a downtime associated with the first instance of the software application.

Some of the multiple compute nodes also include a peer alert service group that is configured to monitor whether the software application is running as expected at other nodes. The peer alert service group includes a peer monitor, a peer monitor checker, or both. The peer monitor accesses cluster process data indicating processes of the software application that are running at the multiple compute nodes. In an example, the first compute node includes the peer alert service group, and the peer monitor provides the cluster process data to the status data analyzer of the first compute node. The peer monitor checker restarts the peer monitor in response to determining that the peer monitor is not running (e.g., has stopped running) at the first compute node.

One or more components of the peer alert service group are configured to monitor one or more other components of the peer alert service group. In a particular example, the peer monitor and the peer monitor checker are configured to monitor each other. To illustrate, the peer monitor restarts the peer monitor checker in response to determining that the peer monitor checker is not running (e.g., has stopped running) at the first compute node and the peer monitor checker restarts the peer monitor in response to determining that the peer monitor is not running (e.g., has stopped running) at the first compute node. In this example, either one of the peer monitor or the peer monitor checker that is not running (e.g., that has stopped running) can be restarted by the other of the peer monitor or the peer monitor checker. The peer alert service group thus provides multiple levels of checks to provide robust monitoring of the processes at the multiple compute nodes.

The peer monitor is configured to, based on analyzing the cluster process data, notify a cluster management device, one or more other compute nodes, or a combination thereof. For example, the peer monitor notifies the cluster management device, the one or more other compute nodes, or a combination thereof, in response to determining that the cluster process data indicates that the second instance of the software application has failed at the second compute node. The peer monitor (or the cluster management device) designates a compute node to handle any incomplete tasks associated with the second instance of the software application. For example, the peer monitor (or the cluster management device) identifies, based on the cluster process data, that the first compute node has the fewest number of processes running among the multiple compute nodes with active (e.g., not failed) instances of the software application. The peer monitor (or the cluster management device), in response to identifying the first compute node as running the fewest number of processes, designates the first compute node to handle any incomplete tasks associated with the second instance of the software application.

The peer monitor, in response to determining that the first compute node is designated, accesses log data associated with the second node. For example, the system includes a storage device (e.g., a network storage device or other shared storage) that maintains log data for the multiple compute nodes. The peer monitor identifies one or more incomplete tasks based on the log data. The peer monitor performs an action associated with the incomplete tasks. For example, the peer monitor reverts an incomplete task (e.g., rolls back an incomplete database update) or completes the incomplete task (e.g., commits a database update). The peer monitor thus enables the compute nodes to reach a valid state for the software application.

FIG. 1 is a block diagram of a system 100 that is operable to monitor processes of a software application. The system 100 includes multiple compute nodes. For example, the system 100 includes compute node 102 coupled via a network 190 to a compute node 104, a compute node 106, a storage device 108, a cluster management device 110, a device 112, or a combination thereof. In a particular aspect, the cluster management device 110 includes a physical device, a virtual device, a process running at the compute node 102, a process running at the compute node 104, a process running at the compute node 106, or a combination thereof. In a particular aspect, the compute node 102, the compute node 104, or the compute node 106 includes the cluster management device 110. For example, one of the compute node 102, the compute node 104, or the compute node 106 is designated as the cluster management device 110.

It should be understood that the system 100 including three compute nodes is described as an illustrative example. In other examples, the system 100 can include fewer than three compute nodes or more than three compute nodes. In a particular aspect, a count of compute nodes of the system 100 changes dynamically as various compute nodes enter or leave a coverage area of the network 190. One or more of the compute node 102, the compute node 104, the compute node 106, and the device 112 include, as an example, a user device, a mobile device, a fixed location device, a communication device, a computing device, a server, a desktop, a network node, a virtual device, or a combination thereof. In a particular aspect, the device 112 includes an automated device, a mobile robot, a mobile robotic platform, or a combination thereof.

The network 190 includes a wired network, a wireless network, or both. The storage device 108 includes, as an example, a network storage device, a shared storage device, a distributed storage system, a data server, or a combination thereof. The cluster management device 110 includes, as an example, a server, a mobile device, a fixed location device, a communication device, a computing device, a desktop, a network node, a virtual device, or a combination thereof. The cluster management device 110 is configured to run a cluster management application. The cluster management application is configured to generate cluster process data 143 indicating a status of processes running at one or more of the compute node 102, the compute node 104, and the compute node 106.

The compute node 102 includes a memory 132 coupled to a processor 134. The processor 134 includes a single-core processor or a multi-core processor. In a particular aspect, the processor 134 includes multiple processors. In a particular aspect, the processor 134 is configured to perform multi-threaded program execution. For example, a single-core processor is configured to appear as performing multi-threaded program execution by interleaving execution of instructions of multiple threads. A multi-core processor is configured to concurrently execute multiple threads. In a particular aspect, the processor 134 includes an application server that is configured to run a first instance 160 of a software application 122.

The compute node 102 includes a service group including a process monitor 140, a process monitor checker 142, or a combination thereof. The process monitor 140 includes a process monitor checker verifier 144. The process monitor 140 is configured to generate (e.g., by executing a process status (ps) command) process status data 105 indicating processes 124 that are running at the processor 134. In a particular aspect, the process status data 105 indicates a status of a subset of the processes 124 that is associated with the first instance 160 of the software application 122 that are running at the processes 124. The process monitor checker 142 is configured to determine whether the process monitor 140 is running at the compute node 102. The process monitor checker 142 is configured to, in response to determining that the process monitor 140 is not running at the compute node 102, start (e.g., restart) the process monitor 140. In a particular aspect, the process monitor checker 142 is configured to determine whether the process monitor 140 has stopped running at the compute node 102. For example, the process monitor checker 142 is configured to determine whether the process monitor 140 was previously running at the compute node 102 and is no longer running at the compute node 102. In this aspect, the process monitor checker 142 is configured to restart the process monitor 140 in response to determining that the process monitor 140 has stopped running at the compute node 102.

The process monitor checker verifier 144 is configured to determine whether the process monitor checker 142 is running at the compute node 102. The process monitor checker verifier 144 is configured to start (e.g., restart) the process monitor checker 142 in response to determining that the process monitor checker 142 is not running at the compute node 102. In a particular aspect, the process monitor checker verifier 144 is configured to determine whether the process monitor checker 142 has stopped running at the compute node 102. For example, the process monitor checker verifier 144 is configured to determine whether the process monitor checker 142 was previously running at the compute node 102 and is no longer running at the compute node 102. In this aspect, the process monitor checker verifier 144 is configured to restart the process monitor checker 142 in response to determining that the process monitor checker 142 has stopped running at the compute node 102. The process monitor checker 142 and the process monitor 140 are thus configured to monitor each other.

It should be understood that the service group including two levels of checks (e.g., the process monitor 140 and the process monitor checker 142) is described as an illustrative example. In other examples, the service group includes more than two levels of checks with one or more components of the service group monitoring one or more other components of the service group.

The compute node 102 includes a status data analyzer 146. The status data analyzer 146 is configured to, based on analyzing the process status data 105, perform one or more actions such as generating notifications, restarting the first instance 160 of the software application 122, starting a process of the software application 122, refraining from restarting the first instance 160 of the software application 122, shutting down the service group (e.g., the process monitor 140, the process monitor checker 142, or both), updating log data 131, or a combination thereof.

In a particular implementation, the compute node 102 includes a peer alert service group. The peer alert service group includes a peer monitor 150, a peer monitor checker 152, or both. The peer monitor 150 includes a peer monitor checker verifier 154. The peer monitor 150 is configured to receive the cluster process data 143 from the cluster management device 110. The peer monitor checker 152 is configured to start (e.g., restart) the peer monitor 150 in response to determining that the peer monitor 150 is not running at the compute node 102. The peer monitor checker verifier 154 is configured to start (e.g., restart) the peer monitor checker 152 in response to determining that the peer monitor checker 152 is not running at the compute node 102. In a particular aspect, the peer monitor checker 152 is configured to restart the peer monitor 150 in response to determining that the peer monitor 150 has stopped running at the compute node 102. The peer monitor checker verifier 154 is configured to restart the peer monitor checker 152 in response to determining that the peer monitor checker 152 has stopped running at the compute node 102. The peer monitor checker 152 and the peer monitor 150 are thus configured to monitor each other.

It should be understood that the peer alert service group including two levels of checks (e.g., the peer monitor 150 and the peer monitor checker 152) is described as an illustrative example. In other examples, the peer alert service group includes more than two levels of checks with one or more components of the peer alert service group monitoring one or more other components of the peer alert service group.

The peer monitor 150 is configured to determine, based on analyzing the cluster process data 143, whether a second instance 162 of the software application 122 failed at the compute node 104. The peer monitor 150 is configured to, in response to determining that the second instance 162 of the software application 122 failed at the compute node 104, notify the cluster management device 110, one or more other compute nodes, or a combination thereof. In a particular aspect, the peer monitor 150 is configured to, in response to determining that the compute node 104 corresponds to (e.g., includes) the cluster management device 110, designate the compute node 102 or the compute node 106 as the cluster management device 110. For example, the peer monitor 150 starts an instance of a cluster management application at the compute node 102 or sends a request to the compute node 106 to start an instance of a cluster management application. The peer monitor 150 is configured to, in response to determining that the compute node 102 is designated to handle any incomplete tasks of the second instance, access log data 141 associated with the compute node 104. The peer monitor 150 is configured to, in response to determining that the log data 141 indicates one or more incomplete tasks 109 associated with the second instance 162 of the software application 122, perform an action 128 associated with the incomplete tasks 109.

In an active-passive configuration, one compute node is maintained in an idle (e.g., passive) state as a backup compute node in case of failure of another compute node that is running an instance of the software application 122. When failure of the software application 122 is detected, an instance of the software application 122 is started at the backup compute node to take over operations for the compute node that experienced the failure. In an active-active configuration, resources are used more efficiently by running instances of the software application 122 at all available compute nodes. In FIG. 1, the cluster management device 110, the compute node 102, the compute node 104, the compute node 106, or a combination thereof, are set up to support an active-active configuration. For example, the cluster management device 110 is configured to start instances of the software application 122 at the compute node 102, the compute node 104, and the compute node 106 (e.g., all available compute nodes of the system 100). The compute node 102 is configured to, in response to detecting failure of the software application 122 at the compute node 104, handle the incomplete tasks 109 associated with the compute node 104. The cluster management device 110 is configured to, in response to detecting a failure of the software application 122 at the compute node 104, select one of the other compute nodes (e.g., an already active compute node) and update a load balancer to redirect future traffic meant for the compute node 104 to the selected compute node (e.g., the compute node 106). The active-active configuration increases efficiency by enabling all available compute nodes to be active and enables recovery to a valid state by handling of the incomplete tasks 109.

The compute node 102 includes a display interface 126, a network interface 130, or both. In FIG. 1, the display interface 126 is coupled to a display 114. The network interface 130 is coupled to the network 190. In a particular aspect, the network interface 130 may include a network interface controller, a network interface device, a network interface socket, a network interface card, a serial network interface, a wireless interface, or a combination thereof.

The memory 132 is configured to store expected process data indicating expected processes associated with the software application 122. For example, the data indicates an expected process 107, an expected process 113, or both. The memory 132 is also configured to store an application restart criterion 111. In a particular aspect, the expected process data, the application restart criterion 111, or both, are based on user input, default data, a configuration setting, or a combination thereof. The memory 132 is configured to store instructions 125. The instructions 125, when executed by the processor 134, perform one or more operations described herein.

It should be noted that in the following description, various functions performed by the system 100 of FIG. 1 are described as being performed by certain components or modules. However, this division of components and modules is for illustration only. In an alternate aspect, a function described herein as performed by a particular component or module is divided amongst multiple components or modules. Moreover, in an alternate aspect, two or more components or modules of FIG. 1 are integrated into a single component or module. Each component or module illustrated in FIG. 1 can be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

During operation, the cluster management device 110 activates instances of the software application 122 and service groups at one or more nodes of the system 100. For example, the cluster management device 110 activates the instances of the software application 122 and the service groups in response to a user input from a system administrator. To illustrate, the cluster management device 110 sends a first request to the compute node 102. The first request indicates that an instance of the software application 122 and a corresponding service group are to be activated at the compute node 102. The status data analyzer 146, in response to receiving the first request, activates (e.g., starts) the first instance 160 of the software application 122 at the compute node 102. The status data analyzer 146, in response to receiving the first request, also activates (e.g., starts) the service group (e.g., the process monitor 140, the process monitor checker 142, or both) at the compute node 102. It should be understood that two components of the service group are provided as an illustrative example. In other examples, the service group includes fewer than two components or more than two components. In some examples, two or more components of the service group are combined into a single component. In some examples, functions described herein as performed by a particular component of the service group are performed by multiple components of the service group.

In a particular aspect, the cluster management device 110 selects at least one compute node to monitor other compute nodes. For example, the cluster management device 110 selects the compute node 102 based on the cluster process data 143. In a particular implementation, the cluster management device 110 receives process status data 105 from the compute node 102, second process status data from the compute node 104, process status data 165 from the compute node 106, or a combination thereof. For example, the cluster management device 110 receives the process status data 105, the second process status data, and the process status data 165 in response to sending a first request to the compute node 102, a second request to the compute node 104, and a request 163 to the compute node 106. The cluster management device 110 generates the cluster process data 143 based on the process status data 105, the second process status data, the process status data 165, or a combination thereof. The cluster process data 143 indicates a first count of the subset of processes 124 associated with the software application 122 that are running at the compute node 102. The cluster management device 110 selects the compute node 102 in response to determining that the first count of the subset of the processes 124 is less than or equal to a second count of processes running at the compute node 104, a third count of processes running at the compute node 106, or both. In a particular implementation, the cluster management device 110 selects the compute node 102 independently of the cluster process data 143. For example, the cluster management device 110 selects the compute node 102 based on a round-robin selection, a user input, default data, a configuration setting, or a combination thereof.

The cluster management device 110 sends a second request to the compute node 102 (e.g., the selected compute node). The status data analyzer 146, in response to receiving the second request, activates (e.g., starts) the peer alert service group (e.g., the peer monitor 150, the peer monitor checker 152, or both) at the compute node 102.

In a particular example, a first thread, a second thread, a third thread, a fourth thread, and a fifth thread of the processor 134 correspond to the first instance 160 of the software application 122, the process monitor 140, the process monitor checker 142, the peer monitor 150, the peer monitor checker 152, respectively. It should be understood that two components of the service group are provided as an illustrative example. In other examples, the service group includes fewer than two components or more than two components. In some examples, two or more components of the service group are combined into a single component. In some examples, functions described herein as performed by a particular component of the service group are performed by multiple components of the service group.

The process monitor checker verifier 144 determines whether the process monitor checker 142 is running at the compute node 102. For example, the process monitor checker verifier 144 executes a first command (e.g., a ps command) to generate first process data indicating at least a subset of the processes 124 that is associated with the process monitor checker 142. In a particular aspect, the first command indicates the process monitor checker 142. In a particular example, an identifier of the process monitor checker 142 is provided as an argument of the first command (e.g., the ps command). The process monitor checker verifier 144, in response to determining that the first process data does not indicate any processes associated with the process monitor checker 142 or does not indicate a particular expected process associated with the process monitor checker 142, determines that the process monitor checker 142 is not running (e.g., not running in a valid state) at the compute node 102. The process monitor checker verifier 144, in response to determining that the process monitor checker 142 is not running at the compute node 102, starts (e.g., restarts) the process monitor checker 142.

In a particular aspect, the process monitor checker verifier 144 is configured to determine whether the process monitor checker 142 has stopped running at the compute node 102. For example, the process monitor checker verifier 144, in response to determining that the process monitor checker 142 is not running at the compute node 102, determines whether a previous version of the first process data indicates that the process monitor checker 142 was previously running at the compute node 102. To illustrate, the process monitor checker verifier 144 generates a first version of the first process data by executing the first command at a first particular time and generates a second version of the first process data by executing the first command at a second particular time. The process monitor checker verifier 144 determines that the process monitor checker 142 has stopped running at the compute node 102 in response to determining that the first version of the first process data indicates that the process monitor checker 142 was running at the first particular time and that the second version of the first process data indicates that the process monitor checker 142 is not running at the second particular time. The process monitor checker verifier 144 stores the second version of the first process data in the memory 132. The process monitor checker verifier 144 restarts the process monitor checker 142 in response to determining that the process monitor checker 142 has stopped running at the compute node 102. In a particular aspect, the process monitor checker verifier 144 executes the first command in response to detecting expiration of a timer (e.g., every 5 minutes), receiving a user input, receiving a request from the status data analyzer 146, or a combination thereof.

The process monitor checker 142 determines whether the process monitor 140 is running at the compute node 102. For example, the process monitor checker 142 executes a second command (e.g., a ps command) to generate second process data indicating at least a subset of the processes 124 that is associated with the process monitor 140. The process monitor checker 142, in response to determining that the second process data does not indicate any processes associated with the process monitor 140 or does not indicate a particular expected process associated with the process monitor 140, determines that the process monitor 140 is not running (e.g., not running in a valid state) at the compute node 102. The process monitor checker 142, in response to determining that the process monitor 140 is not running at the compute node 102, starts (e.g., restarts) the process monitor 140.

In a particular aspect, the process monitor checker 142 determines whether the process monitor 140 has stopped running at the compute node 102. For example, the process monitor checker 142, in response to determining that the process monitor 140 is not running at the compute node 102, determines whether a previous version of the second process data indicates that the process monitor 140 was previously running at the compute node 102. To illustrate, the process monitor checker 142 generates a first version of the second process data by executing the second command at a first particular time and generates a second version of the second process data by executing the second command at a second particular time. The process monitor checker 142 determines that the process monitor 140 has stopped running at the compute node 102 in response to determining that the first version of the second process data indicates that the process monitor 140 was running at the first particular time and that the second version of the second process data indicates that the process monitor 140 is not running at the second particular time. The process monitor checker 142 stores the second version of the second process data in the memory 132. The process monitor checker 142 restarts the process monitor 140 in response to determining that the process monitor 140 has stopped running at the compute node 102. In a particular aspect, the process monitor checker 142 executes the second command in response to detecting expiration of a timer (e.g., every 5 minutes), receiving a user input, receiving a request from the status data analyzer 146, or a combination thereof.

The process monitor 140 generates the process status data 105 for the first instance 160 of the software application 122. For example, the process monitor 140 executes a third command (e.g., a ps command) to generate process status data 105 indicating at least a subset of the processes 124 that is associated with the software application 122. In a particular aspect, the third command indicates the software application 122. In a particular example, an identifier of the software application 122 is provided as an argument of the third command (e.g., the ps command). The process monitor 140 stores the process status data 105 in the memory 132, provides the process status data 105 to the status data analyzer 146, or both. In a particular aspect, the process monitor 140 executes the third command in response to detecting expiration of a timer (e.g., every 5 minutes), receiving a user input, receiving a request from the status data analyzer 146, or a combination thereof.

The status data analyzer 146 analyzes the process status data 105 to check a status of expected processes associated with the software application 122. In a particular aspect, the status data analyzer 146 analyzes the process status data 105 in response to detecting expiration of a timer (e.g., every 5 minutes), receiving a user input, receiving the process status data 105 from the process monitor 140, determining that the process status data 105 has been updated in the memory 132, or a combination thereof.

The status data analyzer 146 determines (e.g., during a first stage of analysis of the process status data 105) a process count 127 based on the process status data 105. The process count 127 indicates a count of a subset of the processes 124 that includes processes of a particular process type (e.g., a Level-1 process, a Level-2 process, a Level-3 process, or a combination thereof). For example, the expected process data indicates a corresponding process type of each of the expected processes associated with the software application 122. The status data analyzer 146 determines the process count 127 based on the process status data 105 and the expected process data. For example, the process count 127 indicates a count of a subset of the processes 124 indicated by the process status data 105. The subset includes processes that are indicated by the expected process data as having the particular process type (e.g., a Level-3 process).

The status data analyzer 146 determines whether the process count 127 satisfies a process count threshold 119. For example, the status data analyzer 146, in response to determining that the process count 127 is greater than or equal to a first threshold (e.g., 10) and is less than or equal to a second threshold (e.g., 20), determines that the process count 127 fails to satisfy the process count threshold 119. As another example, the status data analyzer, in response to determining that the process count 127 is greater than or equal to the second threshold (e.g., 20), determines that the process count 127 fails to satisfy the process count threshold 119. In a particular aspect, the process count threshold 119 indicates the first threshold, the second threshold, or both.

The status data analyzer 146, in response to determining that the process count 127 fails to satisfy a process count threshold 119, performs one or more actions. For example, the one or more actions include generating a notification 151, a notification 153, an update 155, a notification 157, a notification 159, or a combination thereof. One or more of the notification 151, the notification 153, the update 155, the notification 157, or the notification 159 indicate that the process count 127 of the particular process type (e.g., Level-3 process) fails to satisfy the process count threshold. For example, one or more of the notification 151, the notification 153, the update 155, the notification 157, or the notification 159 indicate that the process count 127 of the particular process type (e.g., Level-3 process) is greater than or equal to the first threshold (e.g., 10) and is less than or equal to the second threshold (e.g., 20). As another example, one or more of the notification 151, the notification 153, the update 155, the notification 157, or the notification 159 indicate that the process count 127 of the particular process type (e.g., Level-3 process) is greater than the second threshold (e.g., 20).

The status data analyzer 146 sends, via the network interface 130, the notification 151 to the cluster management device 110, the notification 153 to the device 112, the update 155 to the storage device 108, the notification 157 to the compute node 106, the notification 159 to the compute node 104, or a combination thereof. In a particular aspect, the cluster management device 110, in response to receiving the notification 151, updates dashboard data 121 to indicate that the process count 127 of the particular process type (e.g., Level-3 process) at the compute node 102 fails to satisfy the process count threshold 119. The cluster management device 110 provides the dashboard data 121 to a display, the compute node 102, the compute node 104, the compute node 106, the device 112, or a combination thereof. In a particular aspect, the compute node 102 generates an output 123 based on the dashboard data 121 and provides the output 123 to the display 114. For example, a user can monitor operations of the system 100 by viewing the output 123. In a particular aspect, the dashboard data 121 is associated with a dashboard (e.g., a visual information display and management interface).

In a particular aspect, the device 112, in response to receiving the notification 153, displays a message (e.g., an e-mail message or an alert) at the device 112. In a particular aspect, the device 112, in response to receiving the notification 153, sends a message to the dashboard (e.g., the visual information display and management interface), updates a status log file, or both. The message indicates that the process count 127 of the particular process type (e.g., Level-3 process) at the compute node 102 fails to satisfy the process count threshold 119. In a particular aspect, the storage device 108, in response to receiving the update 155, updates the log data 131 to indicate that the process count 127 of the particular process type (e.g., Level-3 process) at the compute node 102 fails to satisfy the process count threshold 119. The log data 131 is associated with the compute node 102, the software application 122, the first instance 160 of the software application 122, or a combination thereof. In a particular aspect, the compute node 106 (or the compute node 104), in response to receiving the notification 157 (or the notification 159) updates dashboard data to indicate that the process count 127 of the particular process type (e.g., Level-3 process) at the compute node 102 fails to satisfy the process count threshold 119.

The status data analyzer 146 determines (e.g., during a second stage of analysis of the process status data 105) whether one or more of the expected processes indicated by the expected process data are running at the compute node 102. For example, the status data analyzer 146 determines, based on the process status data 105, whether the expected process 107 of the first instance 160 of the software application 122 is running at the first compute node 102. To illustrate, the status data analyzer 146, in response to determining that the process status data 105 indicates that the expected process 107 is stopped or that the processes 124 indicated by the process status data 105 do not include the expected process 107, that the expected process 107 is not running at the compute node 102.

In a particular aspect, the status data analyzer 146 determines whether the expected process 107 has stopped running at the compute node 102. For example, the status data analyzer 146, in response to determining that the expected process 107 is not running at the compute node 102, determines whether a previous version of the process status data 105 indicates that the expected process 107 was previously running at the compute node 102. To illustrate, the status data analyzer 146 generates (e.g., by executing a ps command) a first version of the process status data 105 at a first particular time and generates (e.g., by executing the ps command) a second version of the process status data 105 at a second particular time. The status data analyzer 146 determines that the expected process 107 has stopped running at the compute node 102 in response to determining that the first version of the process status data 105 indicates that the expected process 107 was running at the first particular time and that the second version of the process status data 105 indicates that the expected process 107 is not running at the second particular time. The status data analyzer 146 stores the second version of the process status data 105 in the memory 132.

The status data analyzer 146 performs one or more actions in response to determining that the expected process 107 is not running (or has stopped running) at the compute node 102. The one or more actions include starting (or restarting) the expected process 107, starting (or restarting) the first instance 160 of the software application 122, generating the notification 151, generating the notification 153, generating the update 155, generating the notification 157, generating the notification 159, shutting down (e.g., stopping) the service group (e.g., the process monitor 140, the process monitor checker 142, or both), shutting down the peer alert service group (e.g., the peer monitor 150, the peer monitor checker 152, or both), shutting down the first instance 160 of the software application 122, or a combination thereof. For example, the status data analyzer 146 determines that the expected process data indicates that the expected process 107 is of a process type 117 and selects the one or more actions based on the process type 117.

In a particular aspect, the status data analyzer 146, in response to determining that the process type 117 matches a first process type (e.g., a Level-1 process), determines whether the application restart criterion 111 is satisfied, as further described with reference to FIG. 5B. The status data analyzer 146, in response to determining that the application restart criterion 111 is satisfied, restarts the first instance 160 of the software application 122 at the compute node 102. The status data analyzer 146 generates the notification 151, the notification 153, the update 155, the notification 157, the notification 159, or a combination thereof, indicating that failure of the expected process 107 of the process type 117 is detected and that the first instance 160 of the software application 122 is restarted at the compute node 102.

Alternatively, the status data analyzer 146, in response to determining that the application restart criterion 111 is not satisfied, refrains from restarting the first instance 160 of the software application 122. For example, the status data analyzer 146 shuts down (e.g., stops) the first instance 160 of the software application 122, the process monitor 140, the process monitor checker 142, the peer monitor 150, the peer monitor checker 152, or a combination thereof, at the compute node 102. The status data analyzer 146 generates the notification 151, the notification 153, the update 155, the notification 157, the notification 159, or a combination thereof, indicating that failure of the expected process 107 of the process type 117 is detected and that the first instance 160 of the software application 122 is shutdown at the compute node 102. The cluster management device 110 updates the dashboard data 121 based on the notification 151, the device 112 displays a message based on the notification 153, the storage device 108 updates the log data 131 based on the update 155, the compute node 106 updates dashboard data based on the notification 157, the compute node 104 updates dashboard data based on the notification 159, or a combination thereof to indicate that failure of the expected process 107 of the process type 117 is detected and that the software application 122 is restarted (or shutdown) at the compute node 102.

In a particular aspect, the status data analyzer 146, in response to determining that the process type 117 matches a second process type (e.g., a Level-2 process), starts (e.g., restarts) the expected process 107. The status data analyzer 146 generates the notification 151, the notification 153, the update 155, the notification 157, the notification 159, or a combination thereof, indicating that failure of the expected process 107 of the process type 117 is detected and that the expected process 107 is started (e.g., restarted) at the compute node 102. The cluster management device 110 updates the dashboard data 121 based on the notification 151, the device 112 displays a message based on the notification 153, the storage device 108 updates the log data 131 based on the update 155, the compute node 106 updates dashboard data based on the notification 157, the compute node 104 updates dashboard data based on the notification 159, or a combination thereof, to indicate that failure of the expected process 107 of the process type 117 is detected and that the expected process 107 is started (e.g., restarted) at the compute node 102. The status data analyzer 146 and the service group (e.g., the process monitor 140, the process monitor checker 142, or both) thus reduce a downtime of the first instance 160 of the software application 122 by selectively restarting the first instance 160, by starting the expected process 107 (e.g., the Level-2 process) that corresponds to a valid state of the software application 122, or both.

The peer monitor checker verifier 154 determines whether the peer monitor checker 152 is running at the compute node 102. For example, the peer monitor checker verifier 154 executes a first command (e.g., a ps command) to generate first process data indicating at least a subset of the processes 124 that is associated with the peer monitor checker 152. In a particular aspect, the first command indicates the peer monitor checker 152 (e.g., an identifier of the peer monitor checker 152 is provided with the first command). The peer monitor checker verifier 154, in response to determining that the first process data does not indicate any processes associated with the peer monitor checker 152 or does not indicate a particular expected process associated with the peer monitor checker 152, determines that the peer monitor checker 152 is not running (e.g., not running in a valid state) at the compute node 102. The peer monitor checker verifier 154, in response to determining that the peer monitor checker 152 is not running at the compute node 102, starts (e.g., restarts) the peer monitor checker 152.

In a particular aspect, the peer monitor checker verifier 154 is configured to determine whether the peer monitor checker 152 has stopped running at the compute node 102. For example, the peer monitor checker verifier 154, in response to determining that the peer monitor checker 152 is not running at the compute node 102, determines whether a previous version of the first process data indicates that the peer monitor checker 152 was previously running at the compute node 102. To illustrate, the peer monitor checker verifier 154 generates a first version of the first process data at a first particular time and generates a second version of the first process data at a second particular time. The peer monitor checker verifier 154 determines that the peer monitor checker 152 has stopped running at the compute node 102 in response to determining that the first version of the first process data indicates that the peer monitor checker 152 was running at the first particular time and that the second version of the first process data indicates that the peer monitor checker 152 is not running at the second particular time. The peer monitor checker verifier 154 stores the second version of the first process data in the memory 132. The peer monitor checker verifier 154 restarts the peer monitor checker 152 in response to determining that the peer monitor checker 152 has stopped running at the compute node 102. In a particular aspect, the peer monitor checker verifier 154 executes the first command in response to detecting expiration of a timer (e.g., every 5 minutes), receiving a user input, receiving a request from the status data analyzer 146, or a combination thereof.

The peer monitor checker 152 determines whether the peer monitor 150 is running at the compute node 102. For example, the peer monitor checker 152 executes a second command (e.g., a ps command) to generate second process data indicating at least a subset of the processes 124 that is associated with the peer monitor 150. The peer monitor checker 152, in response to determining that the second process data does not indicate any processes associated with the peer monitor 150 or does not indicate a particular expected process associated with the peer monitor 150, determines that the peer monitor 150 is not running (or not running in a valid state) at the compute node 102. The peer monitor checker 152, in response to determining that the peer monitor 150 is not running at the compute node 102, starts (or restarts) the peer monitor 150.

In a particular aspect, the peer monitor checker 152 is configured to determine whether the peer monitor 150 has stopped running at the compute node 102. For example, the peer monitor checker 152, in response to determining that the peer monitor 150 is not running at the compute node 102, determines whether a previous version of the second process data indicates that the peer monitor 150 was previously running at the compute node 102. To illustrate, the peer monitor checker 152 generates a first version of the second process data at a first particular time and generates a second version of the second process data at a second particular time. The peer monitor checker 152 determines that the peer monitor 150 has stopped running at the compute node 102 in response to determining that the first version of the second process data indicates that the peer monitor 150 was running at the first particular time and that the second version of the second process data indicates that the peer monitor 150 is not running at the second particular time. The peer monitor checker 152 stores the second version of the second process data in the memory 132. The peer monitor checker 152 restarts the peer monitor 150 in response to determining that the peer monitor 150 has stopped running at the compute node 102. In a particular aspect, the peer monitor checker 152 executes the second command in response to detecting expiration of a timer (e.g., every 5 minutes), receiving a user input, receiving a request from the status data analyzer 146, or a combination thereof.

The peer monitor 150 gathers data indicating a status at other compute nodes of expected processes associated with the software application 122. In a particular implementation, the peer monitor 150 receives the cluster process data 143 from the cluster management device 110. In a particular aspect, the peer monitor 150 sends a request to the cluster management device 110 and receives the cluster process data 143 responsive to the request. In an alternative aspect, the cluster management device 110 sends the cluster process data 143 to the peer monitor 150 independently of receiving the request. For example, the cluster management device 110 sends the cluster process data 143 to the peer monitor 150 in response to detecting expiration of a timer, receiving a user input, or both. The peer monitor 150 stores the cluster process data 143 in the memory 132, provides the cluster process data 143 to the status data analyzer 146, or both.

In a particular implementation, the peer monitor 150 receives the log data 141 from the storage device 108. In a particular aspect, the peer monitor 150 sends a log request 161 to the storage device 108 and receives the log data 141 responsive to the log request 161. In an alternative aspect, the storage device 108 sends the log data 141 to the peer monitor 150 independently of receiving the log request 161. For example, the storage device 108 sends the log data 141 to the peer monitor 150 in response to detecting expiration of a timer, receiving a user input, or both. The peer monitor 150 stores the log data 141 in the memory 132, provides the log data 141 to the status data analyzer 146, or both.

The peer monitor 150 checks a status of expected processes associated with the software application 122 at the compute node 104. For example, the peer monitor 150 determines whether the second instance 162 of the software application 122 failed at the compute node 104. In a particular implementation, the peer monitor 150 determines, based on the cluster process data 143, the log data 141, or both, whether the second instance 162 failed at the compute node 104. For example, the peer monitor 150 determines that the cluster process data 143 (or the log data 141) indicates that one or more second processes are running at the compute node 104, that one or more third processes are stopped at the compute node 104, or both. The peer monitor 150, in response to determining that the second processes do not include the expected process 113, that the third processes include the expected process 113, or both, determines that the second instance 162 is not running in a valid state. In a particular aspect, the peer monitor 150, in response to determining that the second instance 162 is not running in a valid state, determines that the second instance 162 of the software application 122 failed at the compute node 104.

In a particular aspect, the peer monitor 150 determines whether the second instance 162 has stopped running in a valid state. For example, the peer monitor 150, in response to determining that the second instance 162 is not running in a valid state, determines whether a previous version of the cluster process data 143 (or a previous version of the log data 141) indicates that the second instance 162 was previously running in a valid state at the compute node 104. To illustrate, the peer monitor 150 determines that a first version of the cluster process data 143 (or a first version of the log data 141) is generated (or received) at a first particular time and that a second version of the cluster process data 143 (or a second version of the log data 141) is generated (or received) at a second particular time. The peer monitor 150 determines that the second instance 162 has stopped running in a valid state at the compute node 104 in response to determining that the first version of the cluster process data 143 (or the first version of the log data 141) indicates that the second instance 162 was running in a valid state at the first particular time and that the second version of the cluster process data 143 (or the second version of the log data 141) indicates that the second instance 162 is not running in a valid state at the second particular time. The peer monitor 150, in response to determining that the second instance 162 has stopped running in a valid state at the compute node 104, determines that the second instance 162 has failed at the compute node 104. The peer monitor 150 stores the second version of the cluster process data 143 (or the second version of the log data 141) in the memory 132.

In a particular aspect, the peer monitor 150, in response to determining that the cluster process data 143 (or the log data 141) indicates that the software application 122 is shutdown at the compute node 104, determines that the second instance 162 of the software application 122 failed at the compute node 104. In a particular aspect, the peer monitor 150 analyzes the cluster process data 143, the log data 141, or both, in response to detecting expiration of a timer (e.g., every 5 minutes), receiving a user input, receiving the cluster process data 143 from the peer monitor 150, determining that the cluster status data 143 has been updated in the memory 132, receiving the log data 141 from the storage device 108, determining that the log data 141 has been updated in the memory 132, or a combination thereof.

The peer monitor 150, in response to determining that the second instance 162 of the software application 122 failed at the second compute node 104, performs one or more actions. The one or more actions include generating the notification 151, the notification 153, the update 155, the notification 157, the notification 159, designating the cluster management device 110, or a combination thereof to indicate that failure of the second instance 162 of the software application 122 at the compute node 104 is detected. For example, the peer monitor 150, in response to determining that the compute node 104 corresponds to (e.g., includes the cluster management device 110), designates the compute node 102 or the compute node 106 as the cluster management device 110. To illustrate, the peer monitor 150 starts an instance of a cluster management application at the compute node 102 or sends a request to the compute node 106 to start an instance of the cluster management application. In a particular aspect, the peer monitor 150, in response to determining that the second instance 162 of the software application 122 failed at the second compute node 104, generates the process status data 105, sends the process status data 105 to the cluster management device 110, or both.

In a particular aspect, the cluster management device 110, in response to receiving the notification 151 and determining that the notification 151 indicates failure of the second instance 162 at the compute node 104, updates a load balancer to redirect future requests meant for the compute node 104 to another compute node. In a particular aspect, the cluster management device 110, in response to receiving the notification 151 and determining that the notification 151 indicates failure of the second instance 162 at the compute node 104, generates (or updates) the cluster process data 143, selects a compute node to perform any incomplete tasks associated with the second instance 162, or both. For example, the cluster management device 110, in response to receiving the notification 151 sends the request 163 to the compute node 106. The compute node 106, in response to receiving the request 163, sends the process status data 165 to the cluster management device 110. The cluster management device 110 generates (or updates) the cluster process data 143 based on the process status data 105, the process status data 165, or both.

The cluster management device 110 determines that the process status data 105 indicates a first count of the subset of the processes 124 associated with the software application 122 that are running at the compute node 102. The cluster management device 110, based on the cluster process data 143, selects the compute node 102 in response to determining that the first count is less than or equal to a second count of processes running at the compute node 106. For example, the second count indicates a subset of processes associated with the software application 122 that are running at the compute node 106. The cluster management device 110 sends an assignment 145 to the compute node 102 (e.g., the selected compute node) to indicate that the compute node 102 is to perform any incomplete tasks associated with the second instance 162.

The peer monitor 150 identifies the incomplete tasks 109 associated with the second instance 162 of the software application 122. In a particular implementation, the peer monitor 150 sends the log request 161 to the storage device 108 in response to determining that the second instance 162 of the software application 122 failed at the compute node 104, receiving the assignment 145 from the cluster management device 110, or both. The peer monitor 150 determines whether the log data 141 indicates the incomplete tasks 109 associated with the second instance 162 of the software application 122.

The peer monitor 150 performs one or more actions associated with the incomplete tasks 109. For example, the peer monitor 150 performs an action 128 associated with an incomplete task 115. In a particular aspect, the peer monitor 150 performs the action 128 to revert the incomplete task 115. For example, the peer monitor 150, in response to determining that the incomplete task 115 includes a database update, performs the action 128 to rollback the database update. In an alternative aspect, the peer monitor 150 performs the action 128 to complete the incomplete task 115. For example, the peer monitor 150, in response to determining that the incomplete task 115 includes a database update, performs the action 128 to commit the database update.

The system 100 thus reduces a downtime of the software application 122 at the compute node 102 by selectively restarting the first instance 160, by starting the expected process 107 (e.g., the Level-2 process) that corresponds to a valid state of the software application 122, or both. The system 100 is able to recover to a valid state by having the compute node 102 handle the incomplete tasks 109 associated with a failed instance of the software application 122 at the compute node 104.

Figure 2:
FIG. 2 is a flow chart that illustrates an example of a method of monitoring processes of a software application.

FIG. 2 illustrates an example of a method 200 of monitoring processes of a software application. In a particular aspect, the method 200 is performed by the cluster management device 110, the compute node 102, the compute node 104, the compute node 106, the system 100 of FIG. 1, or a combination thereof.

The method 200 includes starting software application instances for nodes, at 202. For example, the cluster management device 110 of FIG. 1 sends a first request to the compute node 102, the compute node 104, the compute node 106, or a combination thereof. The compute node 102, in response to receiving the first request from the cluster management device 110, starts the first instance 160 of the software application 122, as described with reference to FIG. 1. In a particular aspect, other compute nodes of the system 100 also start instances of the software application

122 in response to receiving the first request. For example, the compute node 104 starts the second instance 162 of the software application 122.

The method 200 also includes starting service groups for nodes, at 204. For example, the cluster management device 110 of FIG. 1 sends a second request to the compute node 102, the compute node 104, the compute node 106, or a combination thereof. The compute node 102, in response to receiving the second request from the cluster management device 110, starts a service group (e.g., the process monitor 140, the process monitor checker 142, or both) associated with the software application 122, as described with reference to FIG. 1. In a particular aspect, other compute nodes of the system 100 also start instances of service groups in response to receiving the second request. In a particular aspect, the compute node 102 starts the first instance 160 in response to receiving a first request and starts the service group in response to receiving a second request that is distinct from the first request. In an alternative aspect, the compute node 102, in response to receiving a single request, starts the first instance 160 and the service group (e.g., the process monitor 140, the process monitor checker 142, or both).

The method 200 further includes starting a peer alert service group, at 206. For example, the cluster management device 110 of FIG. 1 selects at least one compute node to monitor other compute nodes and sends a third request to the selected compute node. To illustrate, the cluster management device 110 selects the compute node 104, as described with reference to FIG. 1. The cluster management device 110 sends the third request to the compute node 104 (e.g., the selected compute node). The compute node 102, in response to receiving the third request from the cluster management device 110, starts the peer alert service group (e.g., the peer monitor 150, the peer monitor checker 152, or both), as described with reference to FIG. 1.

The method 200 thus enables the cluster management device 110 to start instances of the software application 122 and corresponding service groups at multiple compute nodes. The method 200 also enables the cluster management device 110 to select at least one compute node and start a peer alert service group at the selected compute node to monitor other compute nodes.

Figure 3:
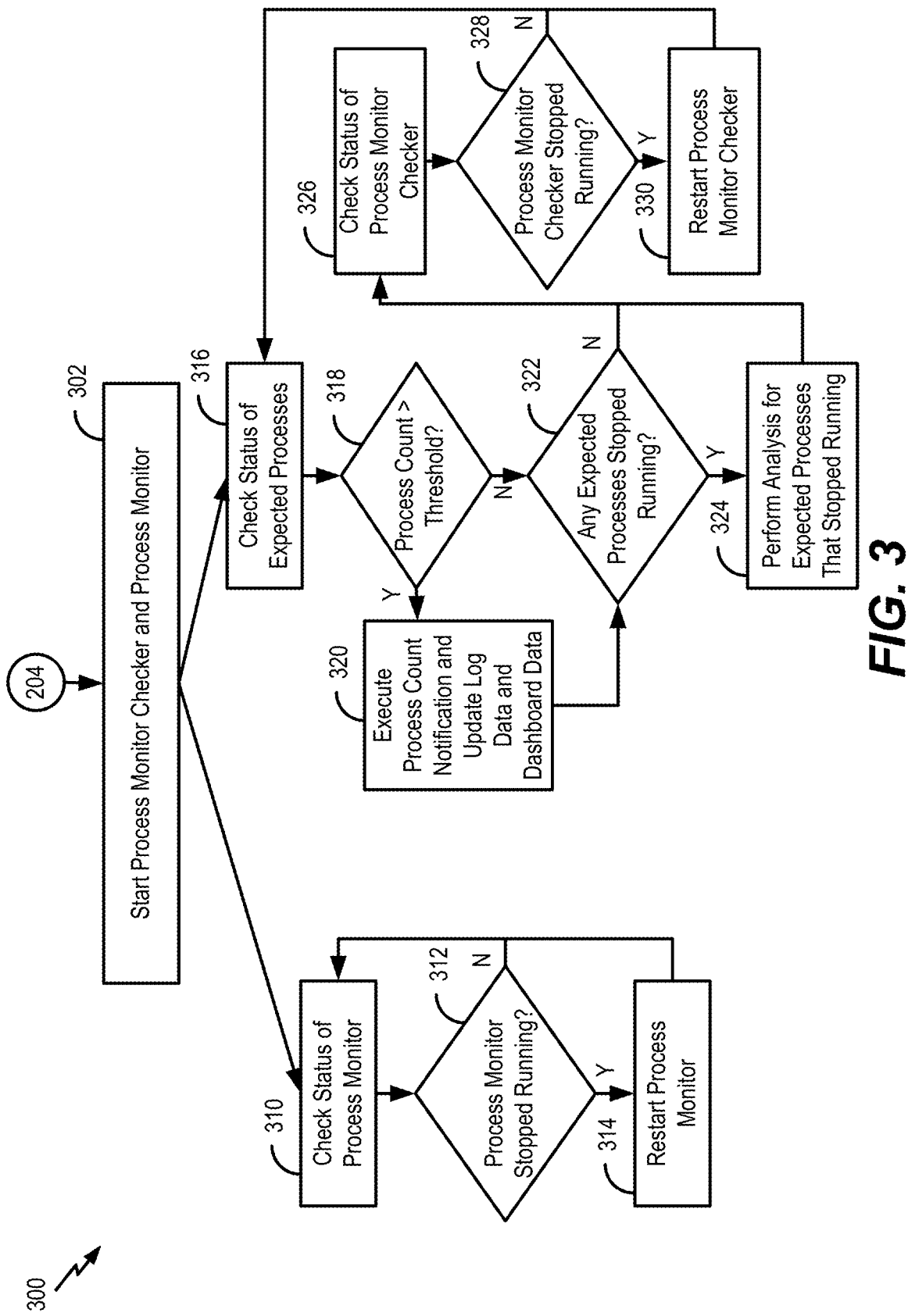
FIG. 3 is a flow chart that illustrates an example of a method of monitoring processes of a software application.

FIG. 3 illustrates an example of a method 300 of monitoring processes of a software application. In a particular aspect, the method 300 is performed by the status data analyzer 146, the process monitor 140, the process monitor checker 142, the process monitor checker verifier 144, the compute node 102, the compute node 104, the compute node 106, the cluster management device 110, the system 100 of FIG. 1, or a combination thereof.

In a particular aspect, the method 300 continues from 204 of FIG. 2. For example, the cluster management device 110 sends the second request to the compute node 102, the compute node 104, the compute node 106, or a combination thereof, to start service groups corresponding to instances of the software application 122. The method 300 is performed, in response to receiving the second request at the compute node 102, the compute node 104, the compute node 106, or a combination thereof.

The method 300 includes starting a process monitor checker and a process monitor, at 302. For example, the status data analyzer 146 of FIG. 1 starts the process monitor checker 142, the process monitor 140, or both, as described with reference to FIG. 1. In a particular aspect, the status data analyzer 146 starts a first thread and a second thread of execution at the processor 134 of FIG. 1 that correspond to the process monitor checker 142 and the process monitor 140, respectively.

The method 300 also includes checking a status of the process monitor, at 310. For example, the process monitor checker 142 of FIG. 1 generates first process status data indicating a subset of the processes 124, if any, that correspond to the process monitor 140, as described with reference to FIG. 1.

The method 300 further includes determining whether the process monitor has stopped running, at 312. For example, the process monitor checker 142 of FIG. 1 determines, based on the first process status data, whether the process monitor 140 has stopped running, as described with reference to FIG. 1.

The method 300 includes, in response to determining that the process monitor has not stopped running, at 312, returning to 310. For example, the process monitor checker 142 of FIG. 1, in response to determining, at a first time, that the process monitor 140 is running or that the process monitor 140 was not previously running, generates an updated version of the first process status data at a second time. To illustrate, the process monitor checker 142 generates the first process status data in response to detecting expiration of a timer.

The method 300 includes, in response to determining that the process monitor has stopped running, at 312, restarting the process monitor, at 314. For example, the process monitor checker 142 of FIG. 1, in response to determining, based on the first process status data, that the process monitor 140 has stopped running, restarts the process monitor 140. The method 300 continues to 310.

The method 300 also includes checking a status of expected processes, at 316. For example, the process monitor 140 of FIG. 1 generates the process status data 105 indicating the processes 124 running at the compute node 102, as described with reference to FIG. 1.

The method 300 further includes determining whether a process count is greater than a threshold, at 318. For example, the status data analyzer 146 of FIG. 1 generates the process count 127 based on the process status data 105, as described with reference to FIG. 1. The status data analyzer 146 determines whether the process count 127 is greater than the process count threshold 119.

The method 300 includes, in response to determining that the process count is greater than the threshold, executing a process count notification, updating log data, and updating dashboard data, at 320. For example, the status data analyzer 146 of FIG. 1, in response to determining that the process count 127 is greater than the process count threshold 119, generates the notification 151, the notification 153, the update 155, the notification 157, the notification 159, or a combination thereof, to indicate that the process count 127 fails to satisfy the process count threshold 119, as described with reference to FIG. 1. In a particular example, the status data analyzer 146, in response to determining that the process count 127 is greater than the process count threshold 119, updates the dashboard data 121 to indicate that the process count 127 fails to satisfy the process count threshold 119.

The method 300 includes determining whether any expected processes have stopped running, at 322. For example, the status data analyzer 146 of FIG. 1 determines, based on the process status data 105, whether any expected processes associated with the software application 122 have stopped running at the compute node 102. The method 300 includes, in response to determining that none of the expected processes have stopped running, at 322, continuing to 326.

The method 300 includes, in response to determining that at least one expected process has stopped running, at 322, performing analysis for expected processes that have stopped running, at 324. For example, the status data analyzer 146 of FIG. 1 performs analysis for expected processes that have stopped running, as further described with reference to FIG. 4.

The method 300 also includes checking status of the process monitor checker, at 326. For example, the process monitor checker verifier 144 of FIG. 1 generates second process status data indicating a subset of the processes 124, if any, that correspond to the process monitor checker 142 of FIG. 1, as described with reference to FIG. 1.

The method 300 further includes determining whether the process monitor checker has stopped running, at 328. For example, the process monitor checker verifier 144 of FIG. 1 determines, based on the second process status data, whether the process monitor checker 142 has stopped running, as described with reference to FIG. 1.

The method 300 includes, in response to determining that the process monitor checker has stopped running, at 328, returning to 316. For example, the process monitor 140 of FIG. 1 generates a first version of the process status data 105 at a first time. The status data analyzer 146 of FIG. 1 determines, based on the first version of the process status data 105, whether any of the expected processes associated with the software application 122 have stopped running and performs analysis of any expected processes that have stopped running. The process monitor checker verifier 144 generates second process status at a second time that is subsequent to the first time. The process monitor checker verifier 144 determines, based on the second process status data, whether the process monitor checker 142 has stopped running and, if the process monitor checker 142 has stopped running, restarts the process monitor checker 142. In a particular aspect, the process monitor 140 generates a second version of the process status data 105 at a third time that is subsequent to the second time. In a particular aspect, the status data analyzer 146 sends a request to the process monitor 140 to provide an updated version of the process status data 105. To illustrate, the status data analyzer 146 sends the request in response to detecting expiration of a timer.

The method 300 includes, in response to determining that the process monitor checker has stopped running, at 328, restarting the process monitor checker, at 330. For example, the process monitor checker verifier 144 of FIG. 1, in response to determining that the second process data indicates that the process monitor checker 142 has stopped running, restarts the process monitor checker 142. The method 300 returns to 316.

The method 300 thus enables robust monitoring of expected processes associated with the software application 122 by providing multiple levels of checks. FIG. 3 illustrates two levels of checks provided by the process monitor checker 142 and the process monitor 140.

Figure 4:
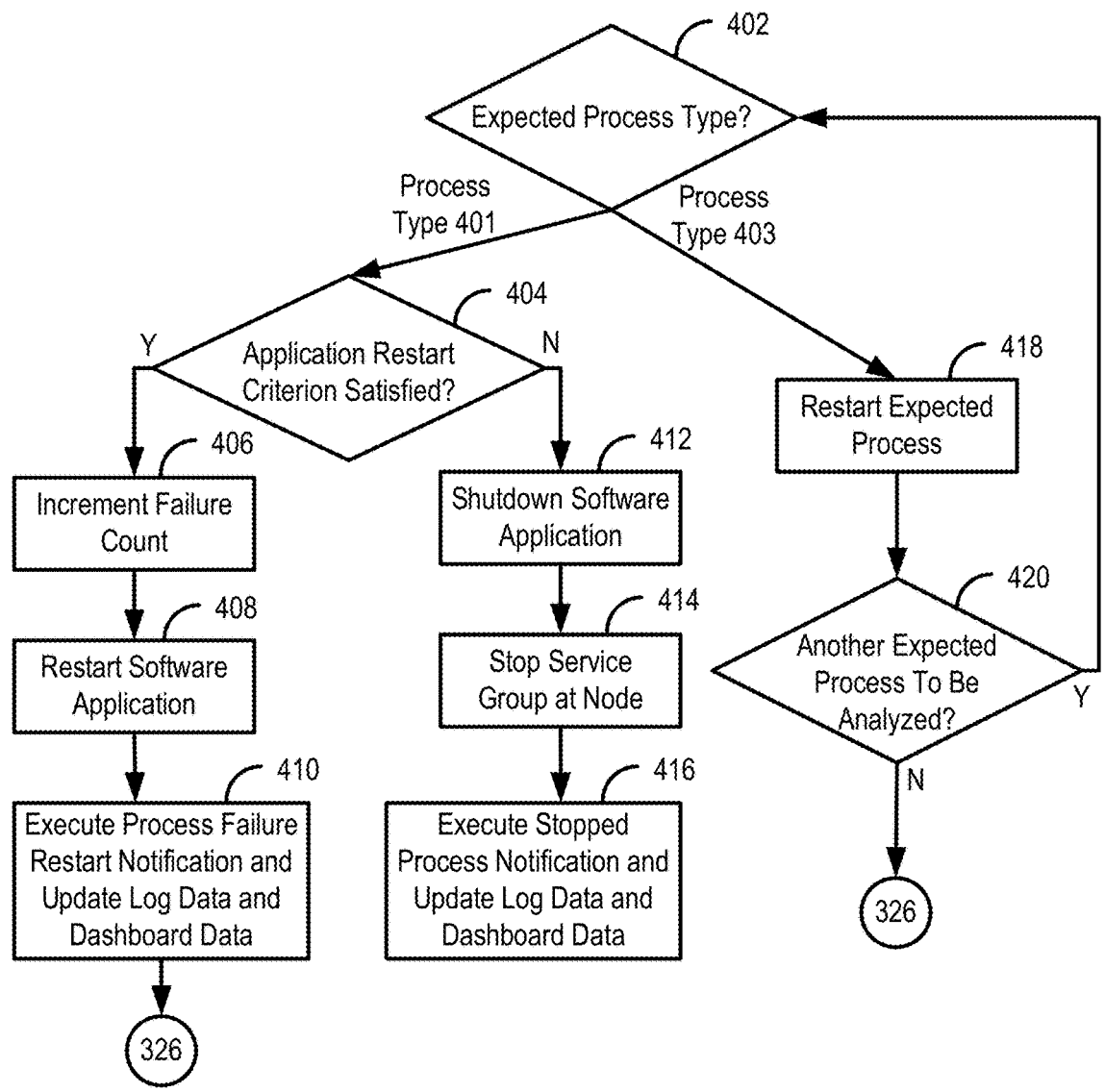
FIG. 4 is a flow chart that illustrates an example of a method of monitoring processes of a software application.

FIG. 4 illustrates an example of a method of monitoring processes of a software application. The method corresponds to 324 of FIG. 3. In a particular aspect, the method 324 is performed by the status data analyzer 146, the compute node 102, the compute node 104, the compute node 106, the system 100 of FIG. 1, or a combination thereof.

The method 324 includes determining a process type of an expected process that has stopped running, at 402. For example, the status data analyzer 146 of FIG. 1 determines, based on expected process data, that the expected process 107 has the process type 117, as described with reference to FIG. 1.

The method 324 also includes, in response to determining that the process type matches a process type 401, at 402, determining whether an application restart criterion is satisfied, at 404. For example, the status data analyzer 146 of FIG. 1, in response to determining that the process type 117 matches a process type 401 (e.g., a Level-1 process), determines whether the application restart criterion 111 is satisfied, as further described with reference to FIG. 5B.

The method 324 includes, in response to determining that the application restart criterion is satisfied, at 404, incrementing a failure counter, at 406. For example, the status data analyzer 146 of FIG. 1, in response to determining that the application restart criterion 111 is satisfied, increments (e.g., by 1) a failure counter 517 of FIG. 5B.

The method 324 further includes restarting a software application, at 408. For example, the status data analyzer 146 of FIG. 1 restarts the first instance 160 of the software application 122.

The method 324 also includes executing process failure restart notification, updating log data, and updating dashboard data, at 410. For example, the status data analyzer 146 of FIG. 1 generates the notification 151, the notification 153, the update 155, the notification 157, the notification 159, or a combination thereof, to indicate that the software application 122 is restarted at the compute node 102, as described with reference to FIG. 1. In a particular aspect, the status data analyzer 146 updates the dashboard data 121 of FIG. 1 to indicate that the software application is restarted at the compute node 102. The method 324 returns to 326.

The method 324 includes, in response to determining that the application restart criterion is not satisfied, at 404, shutting down the software application, at 412. For example, the status data analyzer 146 of FIG. 1, in response to determining that the application restart criterion 111 is not satisfied, shuts down (e.g., stops) the first instance 160 of the software application 122.

The method 324 also includes stopping a service group at the compute node, at 414. For example, the status data analyzer 146 of FIG. 1 stops the service group (e.g., the process monitor 140, the process monitor checker 142 or both) at the compute node 102.

The method 324 further includes executing stopped process notification, updating log data, and updating dashboard data, at 416. For example, the status data analyzer 146 of FIG. 1 generates the notification 151, the notification 153, the update 155, the notification 157, the notification 159, or a combination thereof indicating that the software application 122 is shutdown at the compute node 102. In a particular aspect, the status data analyzer 146 updates the dashboard data 121 to indicate that the software application 122 is shutdown at the compute node 102.

The method 324 includes, in response to determining that the process type matches a process type 403, at 402, restarting the expected process, at 418. For example, the status data analyzer 146 of FIG. 1, in response to determining that the process type 117 matches the process type 403 (e.g., a Level-2 process), restarts the expected process 107.

The method 324 includes determining whether another expected process is to be analyzed, at 420. For example, the status data analyzer 146 of FIG. 1 determines, based on the process status data 105, whether additional expected processes are not running at the compute node 102.

The method 324 includes, in response to determining that another expected process is to be analyzed, at 420, returning to 402. For example, the status data analyzer 146 of FIG. 1, in response to determining, based on the process status data 105, that a second expected process has stopped running and that an analysis related to the second expected process has not been performed, performs an analysis related to the second expected process. The method 324 includes, in response to determining that no other expected processes are to be analyzed, returning to 326. For example, the status data analyzer 146 of FIG. 1, in response to determining that all expected processes that have stopped running have been analyzed, sends a request to the process monitor 140 to check status of the process monitor checker 142 of FIG. 1.

The method 324 thus enables the status data analyzer 146 to analyze the process status data 105 of FIG. 1 and perform various operations based on types of expected processes that have stopped running at the compute node 102. For example, the status data analyzer 146 selectively restarts the first instance 160 of the software application 122 for the expected process 107 of the process type 401. As another example, the status data analyzer 146 restarts the expected process 107 of the process type 403.

Figure 5B:
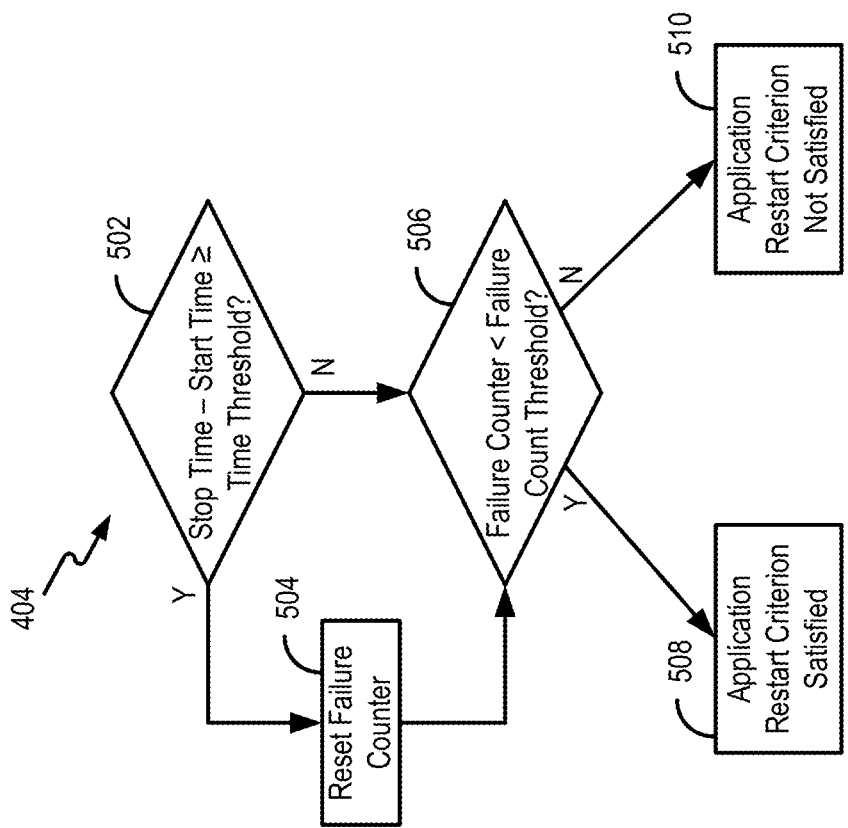
FIG. 5B is a flow chart that illustrates an example of a method performed by a status data analyzer of the system of FIG. 1.
Figure 5A:
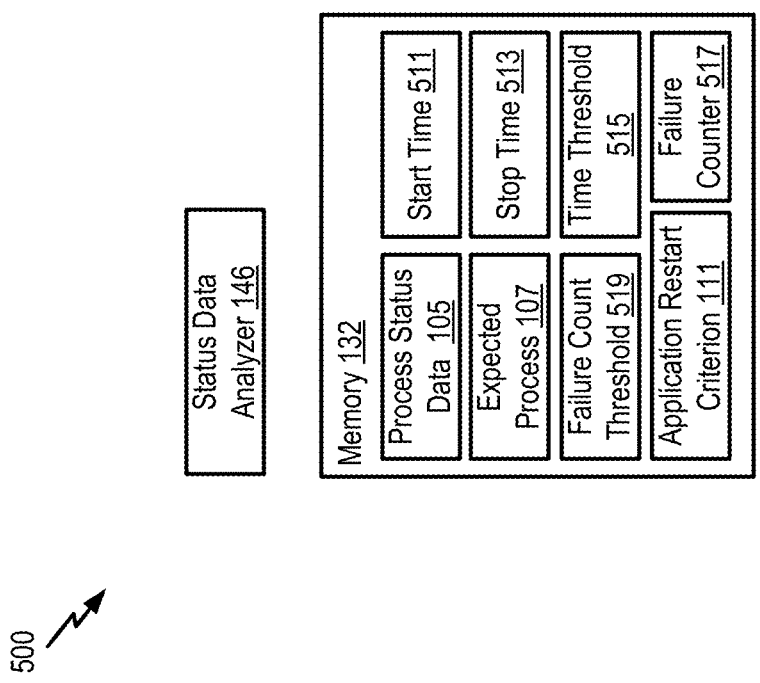
FIG. 5A is a diagram that illustrates an example of a status data analyzer and a memory of the system of FIG. 1.

Referring to FIG. 5A, a diagram is shown and generally designated 500. The diagram 500 illustrates the status data analyzer 146 and the memory 132. The memory 132 is configured to store the process status data 105, a start time 511, a stop time 513, a failure count threshold 519, a time threshold 515, the application restart criterion 111, the failure counter 517, or a combination thereof. In a particular aspect, the failure count threshold 519, the time threshold 515, or both, are based on user input, default data, a configuration setting, or a combination thereof.

The start time 511 indicates a time at which the expected process 107 was previously started at the compute node 104 of FIG. 1. The stop time 513 indicates a time at which the expected process 107 is detected as not running at the compute node 104. For example, the stop time 513 indicates a time at which a determination is made (or a time at which data is generated indicating) that the expected process 107 is not running at the compute node 104. In a particular aspect, the stop time 513 corresponds to a timestamp (e.g., indicating a creation time) of the process status data 105.

Referring to FIG. 5B, an example of a method that corresponds to 404 of FIG. 4 is shown. In a particular aspect, the method 404 is performed by the status data analyzer 146, the compute node 102, the compute node 104, the compute node 106, the system 100 of FIG. 1, or a combination thereof.

The method 404 includes determining whether a difference between a stop time and a start time is greater than or equal to a time threshold, at 502. For example, the status data analyzer 146 determines a difference between the start time 511 and the stop time 513. The status data analyzer 146 determines whether the difference between the start time 511 and the stop time 513 satisfies (e.g., is greater than or equal to) the time threshold 515.

The method 404 includes, in response to determining that the difference between the stop time and the start time is greater than or equal to the time threshold, at 502, resetting a failure counter, at 504. For example, the status data analyzer 146, in response to determining that the difference between the stop time 513 and the start time 511 satisfies (e.g., is greater than or equal to) the time threshold 515, resets the failure counter 517 (e.g., to 0). In a particular aspect, the failure counter 517 indicates a count of consecutive failures of expected processes that have occurred relatively soon after starting of the expected processes.

The method 404 also includes determining whether a current value of the failure counter is less than a failure count threshold, at 506. For example, the status data analyzer 146 of FIG. 1 determines whether the value of the failure counter 517 satisfies (e.g., is less than) the failure count threshold 519.

The method 404 includes, in response to determining that the value of the failure counter is less than the failure count threshold, at 506, determining that an application restart criterion is satisfied, at 508. For example, the status data analyzer 146, in response to determining that value of the failure counter 517 satisfies (e.g., is less than) the failure count threshold 519, determines that the application restart criterion 111 is satisfied.

The method 404 includes, in response to determining that the value of the failure counter is greater than or equal to the failure count threshold, at 506, determining that the application restart criterion is not satisfied, at 510. For example, the status data analyzer 146, in response to determining that the value of the failure counter 517 does not satisfy (e.g., is greater than or equal to) the failure count threshold 519, determines that the application restart criterion 111 is not satisfied. To illustrate, if a count of consecutive failures of expected processes that have occurred relatively soon after starting of the expected processes is greater than or equal to the failure count threshold 519, the status data analyzer 146 refrains from restarting the software application 122 at the compute node 102.

The status data analyzer 146 thus enables determining whether the application restart criterion 111 is satisfied based on a time between starting an expected process and detecting that the expected process is stopped. For example, the status data analyzer 146 shuts down the software application 122 at the compute node 102 in response to detecting that an expected process has stopped relatively soon after starting and that more than a threshold number of failures have been detected.

Figure 6:
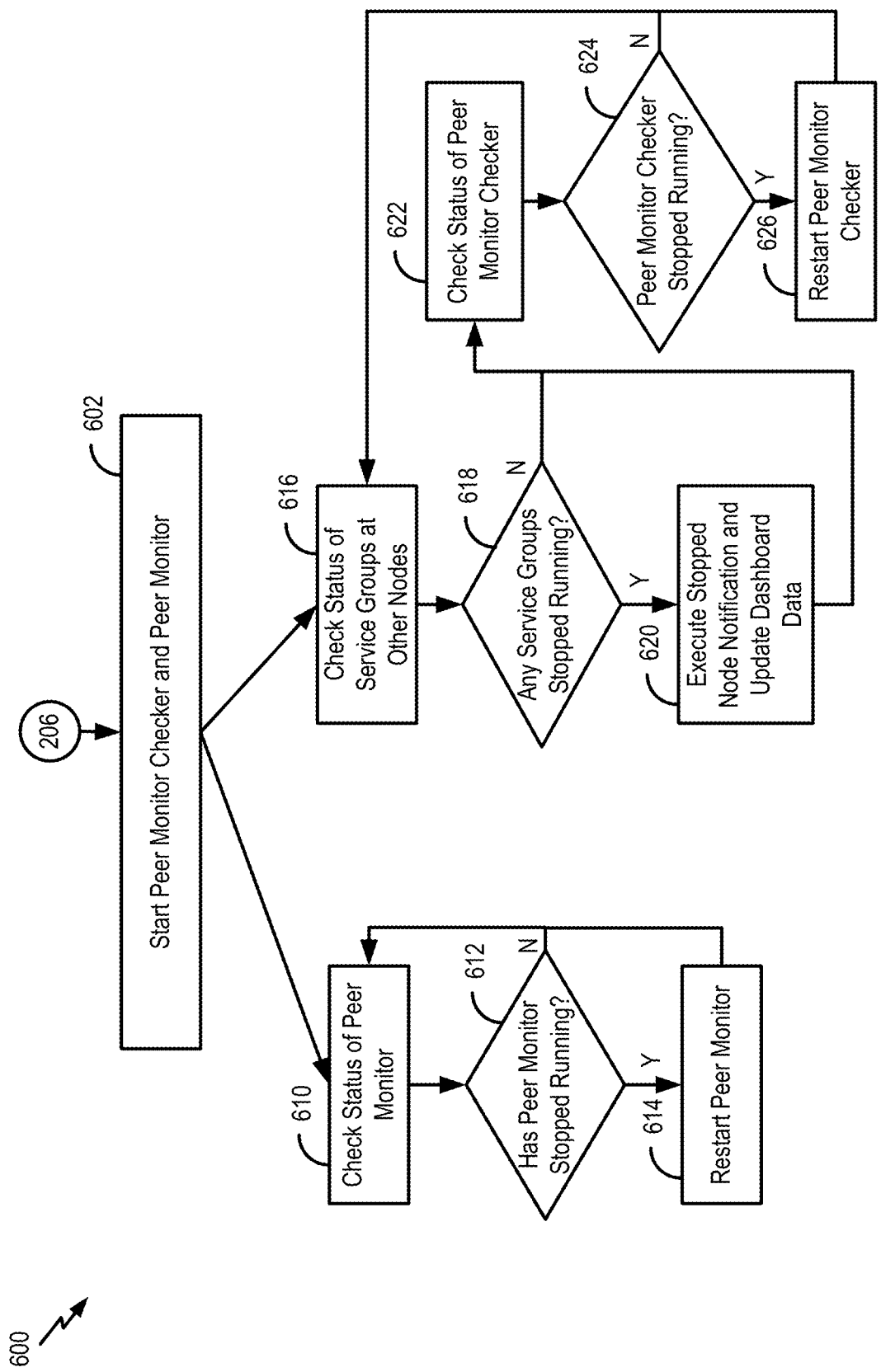
FIG. 6 is a flow chart that illustrates an example of a method of monitoring processes of a software application.

FIG. 6 illustrates an example of a method 600 of monitoring processes of a software application. In a particular aspect, the method 600 is performed by the peer monitor 150, the peer monitor checker 152, the peer monitor checker verifier 154, the compute node 102, the compute node 104, the compute node 106, the system 100 of FIG. 1, or a combination thereof.

In a particular aspect, the method 600 continues from 206 of FIG. 2. For example, the cluster management device 110 sends a request to the compute node 102 (e.g., a selected compute node) to start a peer alert service group. The method 600 is performed at the compute node 102 in response to receiving the request.

The method 600 includes starting a peer monitor checker and a peer monitor, at 602. For example, the status data analyzer 146 of FIG. 1 starts the peer monitor checker 152, the peer monitor 150, or both, as described with reference to FIG. 1. In a particular aspect, the status data analyzer 146 starts a first thread and a second thread of execution at the processor 134 of FIG. 1 that correspond to the peer monitor checker 152 and the peer monitor 150, respectively.

The method 600 also includes, checking a status of a peer monitor, at 610. For example, the peer monitor checker 152 of FIG. 1 generates first process data indicating a subset of the processes 124 that correspond to the peer monitor 150.

The method 600 further includes determining whether peer monitor has stopped running, at 612. For example, the peer monitor checker 152 of FIG. 1 determines, based on the first process data, whether the peer monitor 150 has stopped running at the compute node 102, as described with reference to FIG. 1.

The method 600 also includes, in response to determining that the peer monitor has stopped running, at 612, returning to 610. For example, the peer monitor checker 152 of FIG. 1, in response to determining, at a first time, that the peer monitor 150 is running at the compute node 102 or that the peer monitor 150 was not previously running at the compute node 102, generates an updated version of the first process data at a second time.

The method 600 further includes, in response to determining that the peer monitor has stopped running, at 612, restarting the peer monitor, at 614. For example, the peer monitor checker 152, in response to determining that the peer monitor 150 has stopped running at the compute node 102, restarts the peer monitor 150.

The method 600 includes checking a status of service groups at other nodes, at 616. For example, the peer monitor 150 of FIG. 1 gathers data indicating a status of service groups at other compute nodes. To illustrate, the peer monitor 150 receives, as described with reference to FIG. 1, cluster process data 143 from the cluster management device 110, the log data 141 corresponding to the compute node 104 from the storage device 108, third log data corresponding to the compute node 106 from the storage device 108, or a combination thereof.

The method 600 includes determining whether any service groups have stopped running, at 618. For example, the peer monitor 150 determines whether any service groups at other compute nodes have stopped running. To illustrate, the peer monitor 150 determines whether the cluster process data 143 (or the log data 141) indicates that a second service group (e.g., a second process monitor, a second process monitor checker, or both) has stopped running at the compute node 104. In a particular aspect, the peer monitor 150 determines whether the cluster process data 143 (or the third log data) indicates that a third service group (e.g., a third process monitor, a third process monitor checker, or both) has stopped running at the compute node 106. The method 600 includes, in response to determining that none of the service groups have stopped running, at 618, continuing to 622.

The method 600 includes, in response to determining that at least one service group has stopped running, at 618, executing stopped node notification and updating dashboard data, at 620. For example, the peer monitor 150 determines that the second service group has stopped running in response to determining that at least one of the second process monitor or the second process monitor checker has stopped running at the compute node 104. The peer monitor 150, in response to determining that the second service group has stopped running, generates the notification 151, the notification 153, the notification 157, the notification 159, or a combination thereof to indicate that failure (or shutdown) of the software application 122 is detected at the compute node 104. In a particular aspect, the peer monitor 150 updates the dashboard data 121 to indicate that failure (or shutdown) of the software application 122 is detected at the compute node 104.

The method 600 also includes checking status of the peer monitor checker, at 622. For example, the peer monitor checker verifier 154 of FIG. 1 generates second process data indicating a subset of the processes 124 that correspond to the peer monitor checker 152.

The method 600 further includes determining whether the peer monitor checker has stopped running, at 624. For example, the peer monitor checker verifier 154 of FIG. 1 determines, based on the second process status data, whether the peer monitor checker 152 has stopped running, as described with reference to FIG. 1.

The method 600 includes, in response to determining that the peer monitor checker has stopped running, at 624, returning to 616. For example, the peer monitor 150 of FIG. 1 generates, at a first time, a first version of the cluster process data 143, a first version of log data (e.g., the log data 141, the third log data, or both), or a combination thereof. The peer monitor 150 determines, based on the first version of the cluster process data 143, the first version of the log data, or both, whether service groups at other compute nodes have stopped running and executes stopped node notification for any service groups that have stopped running. The peer monitor checker verifier 154 generates the second process data at a second time that is subsequent to the first time. The peer monitor checker verifier 154 determines, based on the second process data, whether the peer monitor checker 152 has stopped running and, if the peer monitor checker 152 has stopped running, restarts the peer monitor checker 152. The peer monitor 150 generates, at a third time, a second version of the cluster process data 143, a second version of the log data (e.g., the log data 141, the third log data, or both), or a combination thereof. In a particular aspect, the third time is subsequent to the second time. In a particular aspect, the peer monitor 150 sends a first request to the cluster management device 110 for an updated version of the cluster process data 143, sends a second request to the storage device 108 for an updated version of log data (e.g., the log data 141, the third log data, or both), or a combination thereof.

The method 600 includes, in response to determining that the peer monitor checker has stopped running, at 624, restarting the peer monitor checker, at 626. For example, the peer monitor checker verifier 154 of FIG. 1, in response to determining that the second process data indicates that the peer monitor checker 152 has stopped running, restarts the peer monitor checker 152. The method 600 returns to 616.

The method 600 thus enables robust monitoring of processes at other compute nodes using multiple levels of checks. FIG. 6 illustrates two levels of checks provided by the peer monitor checker 152 and the peer monitor 150.

Figure 7:
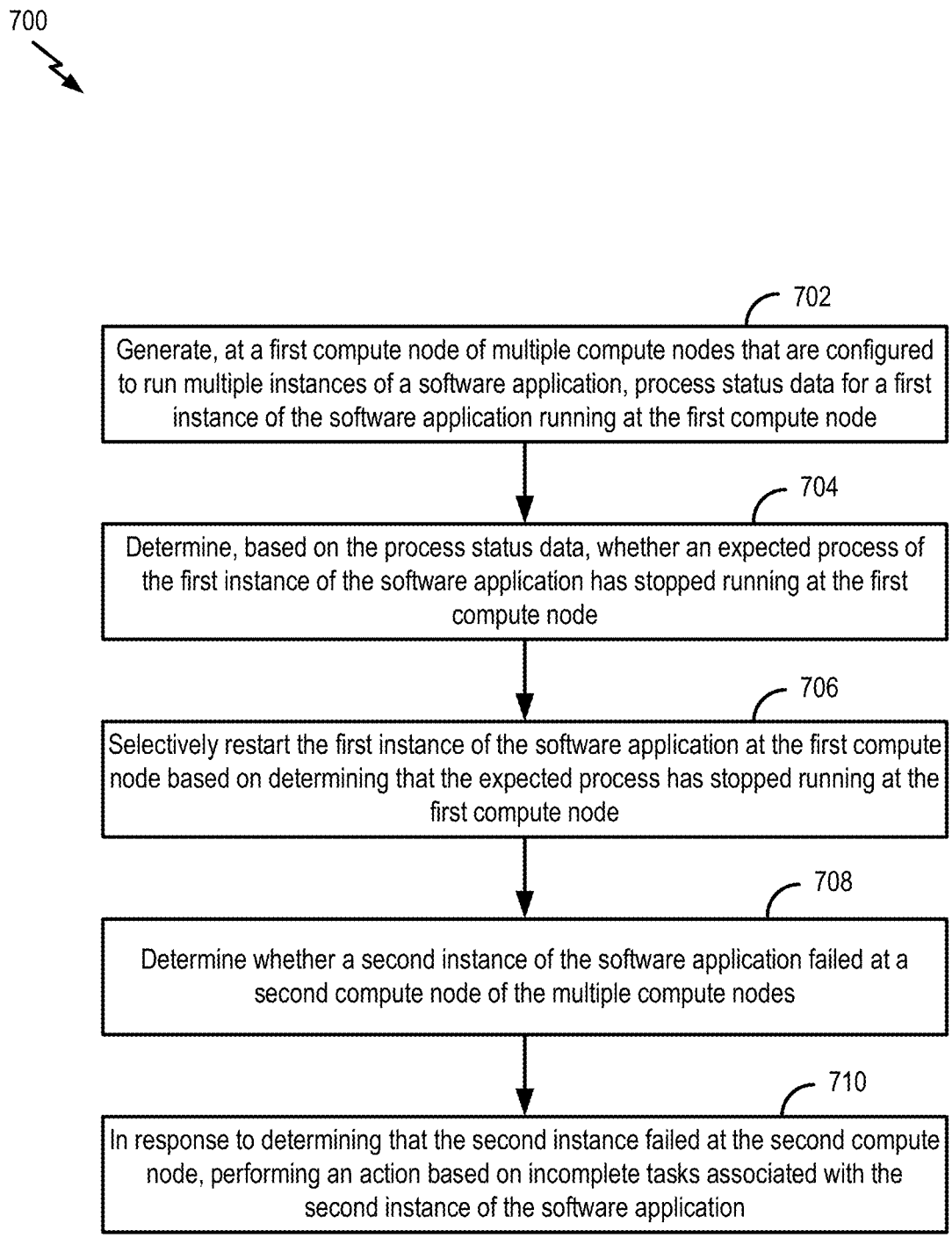
FIG. 7 is a flow chart that illustrates an example of a method of monitoring processes of a software application.

FIG. 7 is a flowchart of a method 700 of monitoring processes of a software application. The method 700 can be performed by the status data analyzer 146, the process monitor 140, the peer monitor 150, the compute node 102, the compute node 104, the compute node 106, the system 100 of FIG. 1, or a combination thereof.

The method 700 includes generating, at a first compute node of multiple compute nodes that are configured to run multiple instances of a software application, process status data for a first instance of the software application running at the first compute node, at 702. For example, the process monitor 140 of FIG. 1 generates process status data 105 for the first instance 160 of the software application 122 running at the compute node 102. In a particular aspect, the compute node 102, the compute node 104, and the compute node 106 are configured to run the first instance 160, the second instance 162, and a third instance, respectively, of the software application 122.

The method 700 also includes determining, based on the process status data, whether an expected process of the first instance of the software application has stopped running at the first compute node, at 704. For example, the status data analyzer 146 of FIG. 1 determines, based on the process status data 105, whether the expected process 107 of the first instance 160 of the software application 122 has stopped running at the compute node 102, as described with reference to FIG. 1.

The method 700 further includes selectively restarting the first instance of the software application at the first compute node based on determining that the expected process has stopped running at the first compute node, at 706. For example, the status data analyzer 146 of FIG. 1 selectively restarts the first instance 160 of the software application 122 at the compute node 102 based on determining that the expected process 107 has stopped running at the compute node 102, as described with reference to FIG. 1.

The method 700 also includes determining whether a second instance of the software application failed at a second compute node of the multiple compute nodes, at 708. For example, the peer monitor 150 of FIG. 1 determines whether the second instance 162 of the software application 122 failed at the compute node 104, as described with reference to FIG. 1.

The method 700 further includes, in response to determining that the second instance failed at the second compute node, performing an action based on incomplete tasks associated with the second instance of the software application, at 710. For example, the peer monitor 150 of FIG. 1, in response to determining that the second instance 162 of the software application 122 failed at the compute node 104, performs the action 128 based on the incomplete tasks 109 associated with the second instance 162 of the software application 122, as described with reference to FIG. 1.

The method 700 thus reduces a downtime of the software application 122 at the compute node 102 by selectively restarting the first instance 160. The method 700 also enables recovery to a valid state by having the compute node 102 handle the incomplete tasks 109 associated with a failed instance of the software application 122 at the compute node 104.

Figure 8:
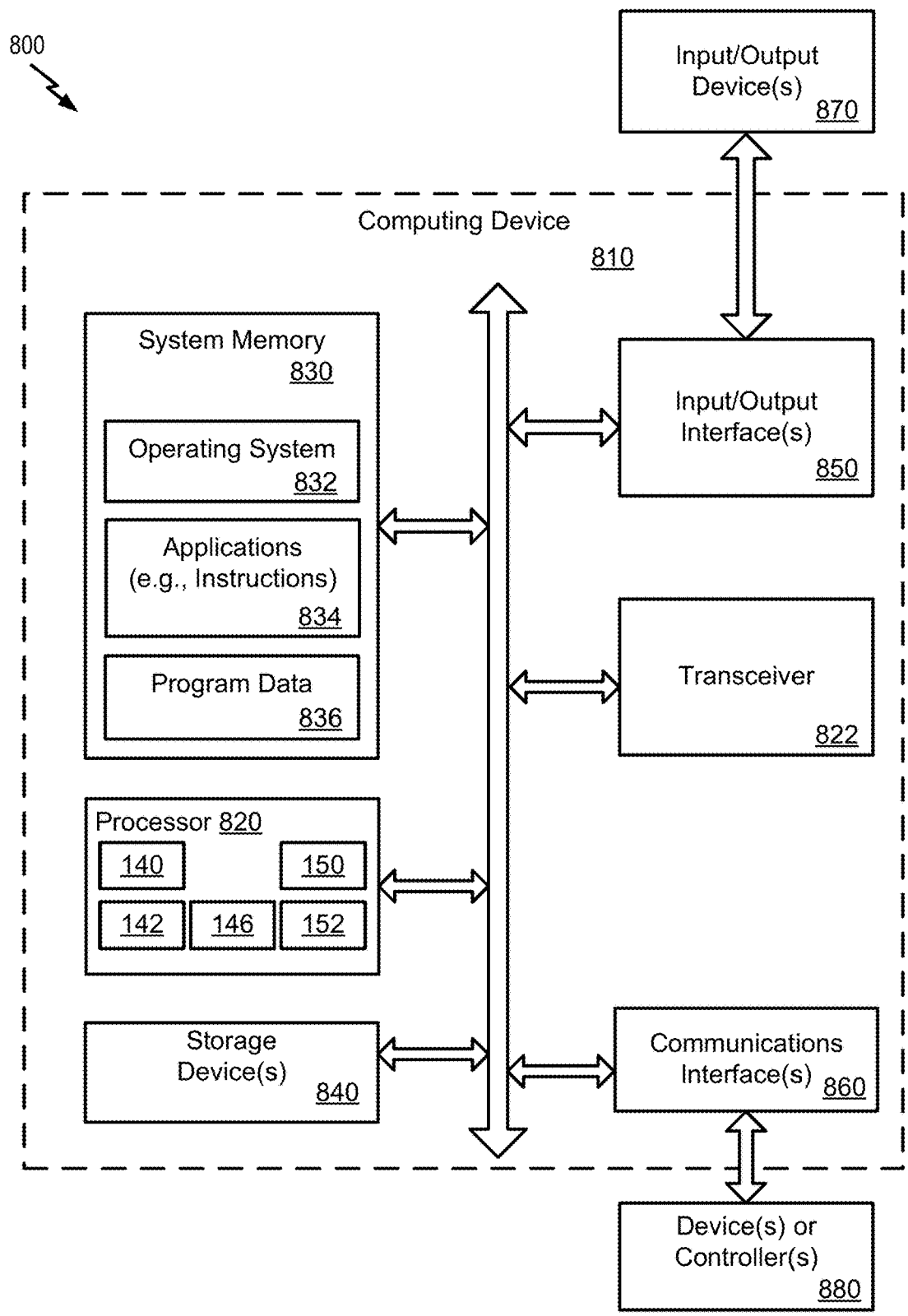
FIG. 8 is a block diagram that depicts a computing environment including a computing device configured to support aspects of computer-implemented methods and computer-executable program instructions (or code) according to the present disclosure.

FIG. 8 is an illustration of a block diagram of a computing environment 800 including a computing device 810 configured to support aspects of computer-implemented methods and computer-executable program instructions (or code) according to the present disclosure. For example, the computing device 810, or portions thereof, is configured to execute instructions to initiate, perform, or control one or more operations described with reference to FIGS. 1-7. In a particular aspect, the computing device 810 corresponds to the compute node 102, the compute node 104, the compute node 106, the cluster management device 110, or a combination thereof.

The computing device 810 includes the transceiver 822. The computing device 810 includes a processor 820. In a particular aspect, the processor 820 corresponds to the processor 134 of FIG. 1. In a particular aspect, the processor 820 includes the process monitor 140, the process monitor checker 142, the status data analyzer 146, the peer monitor 150, the peer monitor checker 152, or a combination thereof. The processor 820 is configured to communicate with system memory 830, one or more storage devices 840, one or more input/output interfaces 850, one or more communications interfaces 860, or a combination thereof. The system memory 830 includes volatile memory devices (e.g., random access memory (RAM) devices), nonvolatile memory devices (e.g., read-only memory (ROM) devices, programmable read-only memory, and flash memory), or both. The system memory 830 stores an operating system 832, which may include a basic input/output system for booting the computing device 810 as well as a full operating system to enable the computing device 810 to interact with users, other programs, and other devices. The system memory 830 stores system (program) data 836. In a particular aspect, the memory 132 of FIG. 1 includes the system memory 830, the one or more storage devices 840, or a combination thereof.

The system memory 830 includes one or more applications 834 executable by the processor 820. As an example, the one or more applications 834 include the instructions 125 of FIG. 1 executable by the processor 820 to initiate, control, or perform one or more operations described with reference to FIGS. 1-7. To illustrate, the one or more applications 834 include the instructions 125 of FIG. 1 executable by the processor 820 to initiate, control, or perform one or more operations described with reference to the process monitor 140, the process monitor checker 142, the status data analyzer 146, the peer monitor 150, the peer monitor checker 152, or a combination thereof.

The processor 820 is configured to communicate with one or more storage devices 840. For example, the one or more storage devices 840 include nonvolatile storage devices, such as magnetic disks, optical disks, or flash memory devices. In a particular example, the storage devices 840 include both removable and non-removable memory devices. The storage devices 840 are configured to store an operating system, images of operating systems, applications, and program data. In a particular aspect, the system memory 830, the storage devices 840, or both, include tangible computer-readable media. In a particular aspect, one or more of the storage devices 840 are external to the computing device 810.

The processor 820 is configured to communicate with one or more input/output interfaces 850 that enable the computing device 810 to communicate with one or more input/output devices 870 to facilitate user interaction. The processor 820 is configured to detect interaction events based on user input received via the input/output interfaces 850. In a particular aspect, the input/output devices 870 include the display 114 of FIG. 1. The processor 820 is configured to send a display to the display 114 of FIG. 1 via the input/output interfaces 850. In a particular aspect, the input/output interfaces 850 include the display interface 126 of FIG. 1. The processor 820 is configured to communicate with devices or controllers 880 via the one or more communications interfaces 860. For example, the one or more communications interfaces 860 include the network interface 130 of FIG. 1 and the devices or controllers 880 include the cluster management device 110, the storage device 108, the compute node 104, the compute node 106, the network 190, or a combination thereof. In an illustrative example, a non-transitory computer-readable storage medium (e.g., the system memory 830) includes instructions that, when executed by a processor (e.g., the processor 820), cause the processor to initiate, perform, or control operations. The operations include one or more operations described with reference to FIGS. 1-7.

Although one or more of FIGS. 1-8 illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. For example, one or more elements of the method 700 of FIG. 7 may be performed in combination with other operations described herein. Accordingly, no single implementation described herein should be construed as limiting and implementations of the disclosure may be suitably combined without departing form the teachings of the disclosure. As an example, one or more operations described with reference to FIGS. 1-8 may be optional, may be performed at least partially concurrently, and/or may be performed in a different order than shown or described.

Examples described above are illustrative and do not limit the disclosure. It is to be understood that numerous modifications and variations are possible in accordance with the principles of the present disclosure.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

The invention claimed is:

1. A system comprising:
a first compute node of multiple compute nodes that are configured to run multiple instances of a software application, wherein the first compute node comprises:
   a process monitor configured to generate process status data for a first instance of the software application running at the first compute node;
   a status data analyzer configured to:
      determine, based on the process status data, whether an expected process of the first instance of the software application has stopped running at the first compute node; and
      selectively restart the first instance of the software application based on determining that the expected process has stopped running at the first compute node;
   a process monitor checker configured to:
      determine whether the process monitor has stopped running at the first compute node; and
      restart the process monitor in response to determining that the process monitor has stopped running at the first compute node; and
   a peer monitor configured to:
      determine whether a second instance of the software application failed at a second compute node of the multiple compute nodes; and
      in response to determining that the second instance failed at the second compute node, perform an action based on incomplete tasks associated with the second instance of the software application; and
the second compute node.

2. The system of claim 1, wherein the process monitor further comprises a process monitor checker verifier configured to:
determine whether the process monitor checker has stopped running at the first compute node; and
restart the process monitor checker in response to determining that the process monitor checker has stopped running at the first compute node.

3. The system of claim 1, wherein the first compute node further comprises a peer monitor checker configured to:
determine whether the peer monitor has stopped running at the first compute node; and
restart the peer monitor in response to determining that the peer monitor has stopped running at the first compute node.

4. The system of claim 3, wherein the peer monitor further comprises a peer monitor checker verifier configured to:
determine whether the peer monitor checker has stopped running at the first compute node; and
restart the peer monitor checker in response to determining that the peer monitor checker has stopped running at the first compute node.

5. The system of claim 1, wherein the status data analyzer is configured to, in response to determining that the expected process has stopped running at the first compute node:
determine whether an application restart criterion is satisfied; and
in response to determining that the application restart criterion is satisfied, restart the first instance of the software application at the first compute node.

6. The system of claim 5, wherein the status data analyzer is configured to:
determine, based on the process status data, that the expected process is detected at a first time as not running at the first compute node;
determine whether a difference between the first time and a start time is greater than or equal to a time threshold, wherein the start time indicates a time at which the expected process was previously started at the first compute node;
in response to determining that the difference is greater than or equal to the time threshold, reset a failure counter; and
determine, based on the failure counter, whether the application restart criterion is satisfied.

7. The system of claim 5, wherein the status data analyzer is configured to, subsequent to determining that the expected process of the first instance of the software application has stopped running at the first compute node:
determine whether a failure counter is greater than or equal to a failure count threshold; and
in response to determining that the failure counter is less than the failure count threshold, determine that the application restart criterion is satisfied.

8. The system of claim 7, wherein the status data analyzer is configured to, in response to determining that the failure counter is greater than or equal to the failure count threshold, determine that the application restart criterion is not satisfied.

9. The system of claim 5, wherein the status data analyzer is configured to, in response to determining that the application restart criterion is not satisfied, refrain from restarting the first instance of the software application at the first compute node.

10. The system of claim 5, further comprising a cluster management device and a storage device, wherein the status data analyzer is configured to, in response to determining that the application restart criterion is not satisfied, send a first notification to a user device, send a second notification to the cluster management device, send a third notification to a third compute node of the multiple compute nodes, update log data at the storage device to indicate that the software application is shutdown at the first compute node, or a combination thereof.

11. The system of claim 5, wherein the status data analyzer is configured to, in response to determining that the application restart criterion is not satisfied, stop the process monitor, the process monitor checker, and the peer monitor from running at the first compute node.

12. A method comprising:
generating, at a first compute node of multiple compute nodes that are configured to run multiple instances of a software application, process status data for a first instance of the software application running at the first compute node;
determining, based on the process status data, whether an expected process of the first instance of the software application has stopped running at the first compute node;
selectively restarting the first instance of the software application at the first compute node based on determining that the expected process has stopped running at the first compute node;
determining, at the first compute node, whether a second instance of the software application failed at a second compute node of the multiple compute nodes; and
in response to determining that the second instance failed at the second compute node, performing an action at the first compute node based on incomplete tasks associated with the second instance of the software application, wherein the incomplete tasks comprise a database update, and wherein the action comprises performing a rollback of the database update or committing the database update.

13. The method of claim 12, further comprising:
receiving, at the first compute node from a storage device, log data associated with the second compute node; and
identifying the incomplete tasks based on the log data.

14. The method of claim 12, wherein performing the action comprises reverting an incomplete task or completing the incomplete task.

15. The method of claim 12, wherein the first instance of the software application is selectively restarted based at least in part on a difference between a first time at which the expected process is detected as not running at the first compute node and a start time at which the expected process was previously started at the first compute node.

16. The method of claim 12, further comprising:
receiving cluster process data from a cluster management device; and
determining, based on the cluster process data, that the second instance of the software application failed at the second compute node.

17. The method of claim 16, further comprising, in response to determining that the cluster process data indicates that a second expected process of the second instance of the software application has stopped running at the second compute node, determining that the second instance of the software application failed at the second compute node.

18. The method of claim 12, further comprising:
receiving, at the first compute node from a storage device, log data associated with the second compute node; and
in response to determining that the log data indicates that the software application is shutdown at the second compute node, determining that the second instance of the software application failed at the second compute node.

19. A non-transitory computer-readable storage device storing instructions that, when executed by a processor, cause the processor to perform operations comprising:
generating, at a first compute node of multiple compute nodes that are configured to run multiple instances of a software application, process status data for a first instance of the software application running at the first compute node;
determining, based on the process status data, whether an expected process of the first instance of the software application has stopped running at the first compute node;
selectively restarting the first instance of the software application at the first compute node based on determining that the expected process has stopped running at the first compute node, wherein the first instance of the software application is selectively restarted based at least in part on a difference between a first time at which the expected process is detected as not running at the first compute node and a start time at which the expected process was previously started at the first compute node;
determining, at the first compute node, whether a second instance of the software application failed at a second compute node of the multiple compute nodes; and
in response to determining that the second instance failed at the second compute node, performing an action at the first compute node based on incomplete tasks associated with the second instance of the software application.

20. The non-transitory computer-readable storage device of claim 19, wherein the operations further comprise, in response to determining that the second instance failed at the second compute node:
sending, from the first compute node to a cluster management device, a notification indicating that the second instance failed at the second compute node; and
receiving, at the first compute node from the cluster management device, an assignment of the incomplete tasks, wherein the action is performed in response to receiving the assignment.

21. The non-transitory computer-readable storage device of claim 20, wherein the operations further comprise:
in response to receiving the assignment from the cluster management device, sending a request for log data associated with the second compute node to a storage device; and
identifying the incomplete tasks based on the log data.

22. The non-transitory computer-readable storage device of claim 20, wherein the operations further comprise, in response to determining that the second instance failed at the second compute node, sending the process status data of the first compute node to the cluster management device, the notification sent to the cluster management device to initiate sending of a request for second process status data from the cluster management device to a third compute node of the multiple compute nodes, wherein the assignment is based on the process status data and the second process status data.

* * * * *